Jan. 25, 1966    G. P. ADAMS ETAL    3,230,608
METHODS AND APPARATUS FOR ASSEMBLING AND SECURING
CONDUCTORS TO TERMINALS OF ELECTRICAL DEVICES
Filed Nov. 17, 1961    20 Sheets-Sheet 1

INVENTORS
G. P. ADAMS
H. E. BRENT
BY *S. Gundersen*
ATTORNEY

INVENTORS
G. P. ADAMS
H. E. BRENT
BY *S. Gundersen*
ATTORNEY

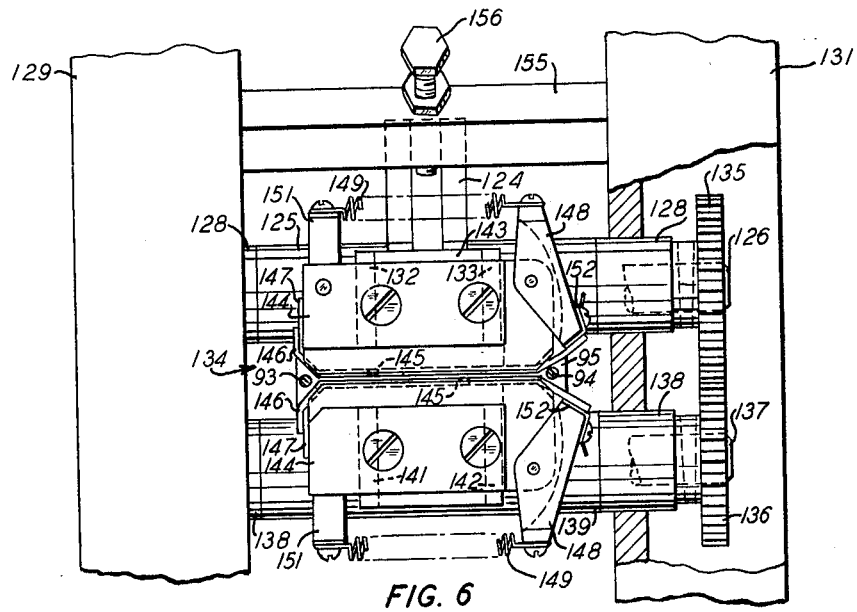

INVENTORS
G. P. ADAMS
H. E. BRENT
BY /S. Gundersen
ATTORNEY

Jan. 25, 1966   G. P. ADAMS ETAL   3,230,608
METHODS AND APPARATUS FOR ASSEMBLING AND SECURING
CONDUCTORS TO TERMINALS OF ELECTRICAL DEVICES
Filed Nov. 17, 1961   20 Sheets-Sheet 7
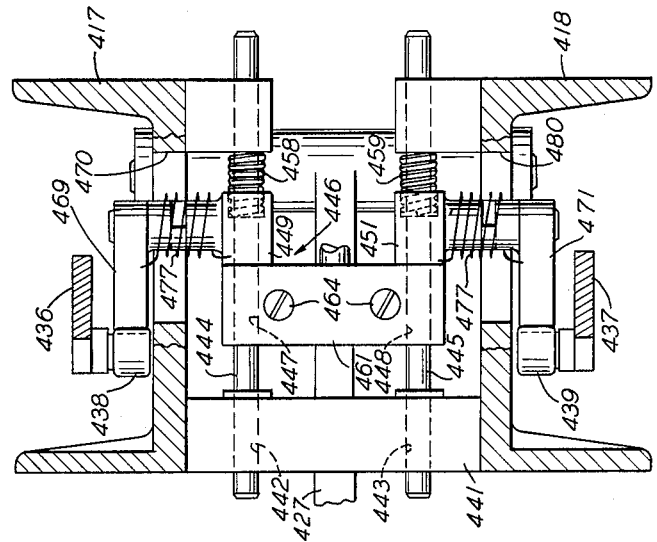
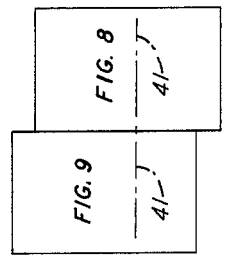
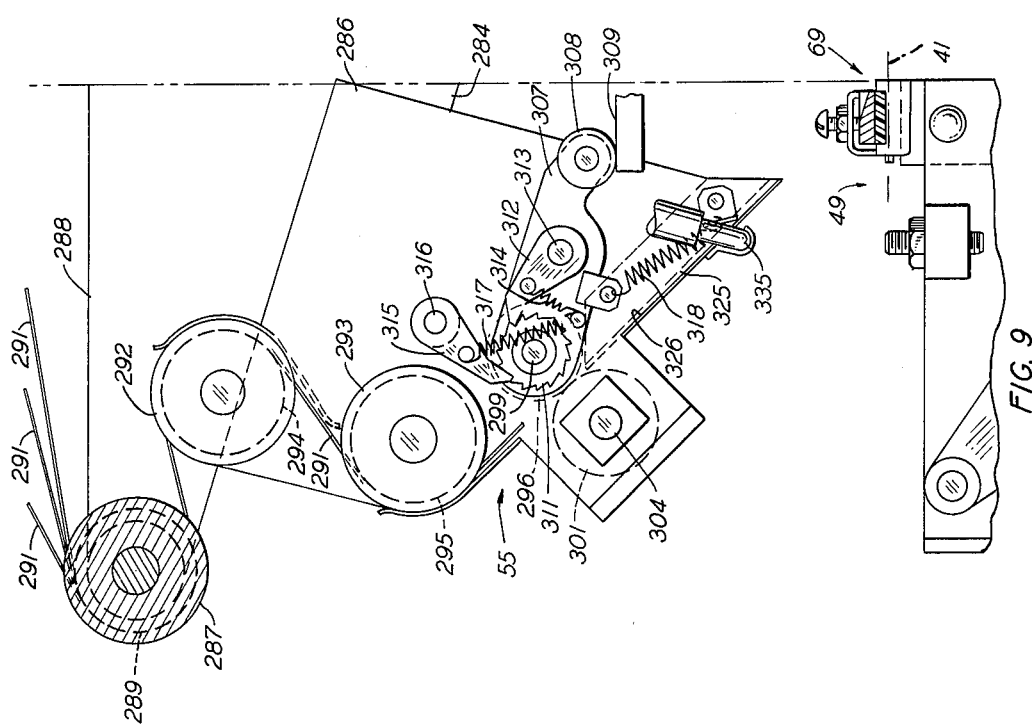
INVENTORS
C. P. ADAMS
H. E. BRENT
BY S. Gundersen
ATTORNEY

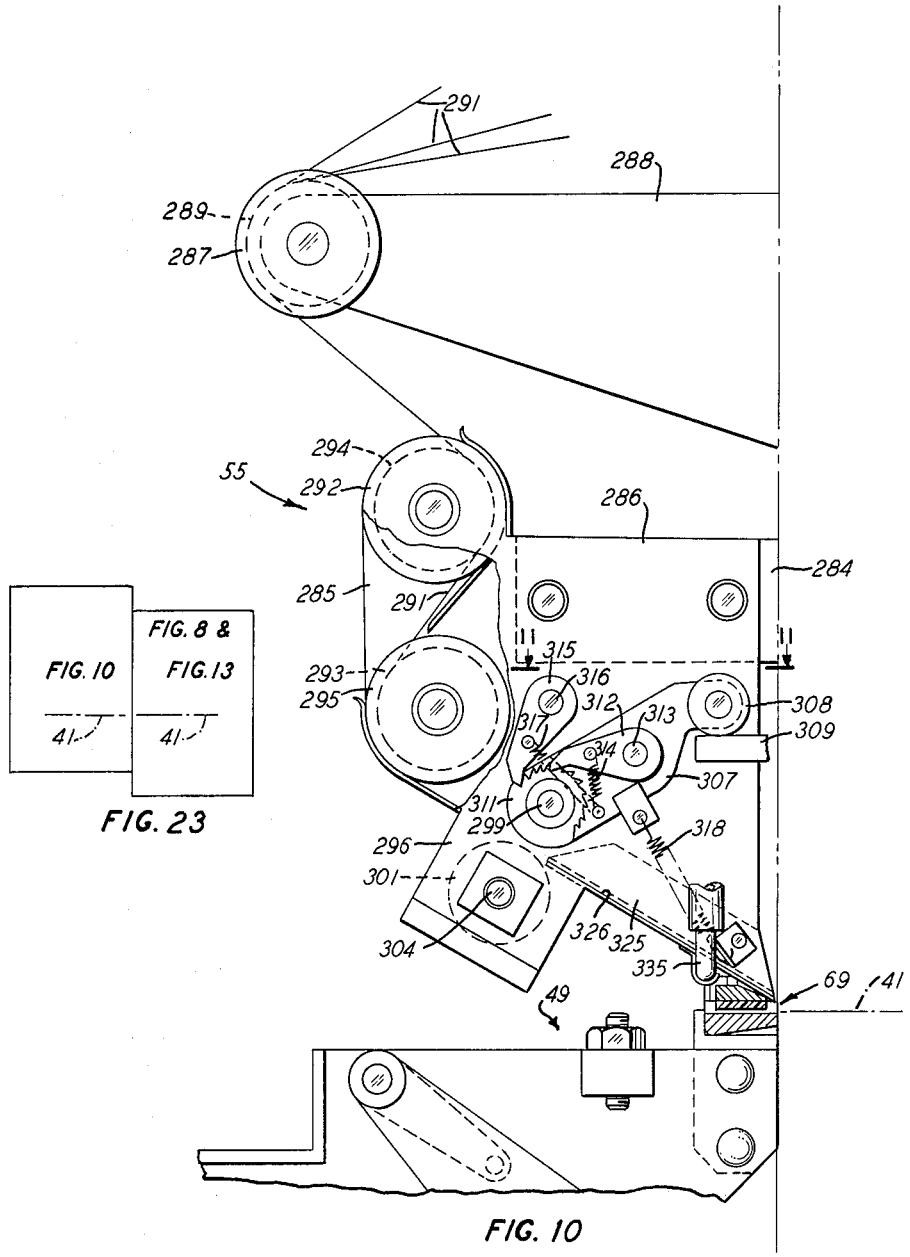

INVENTORS
G. P. ADAMS
H. E. BRENT
BY
S. Gundersen
ATTORNEY

INVENTORS
G. P. ADAMS
H. E. BRENT
BY *Gundersen*
ATTORNEY

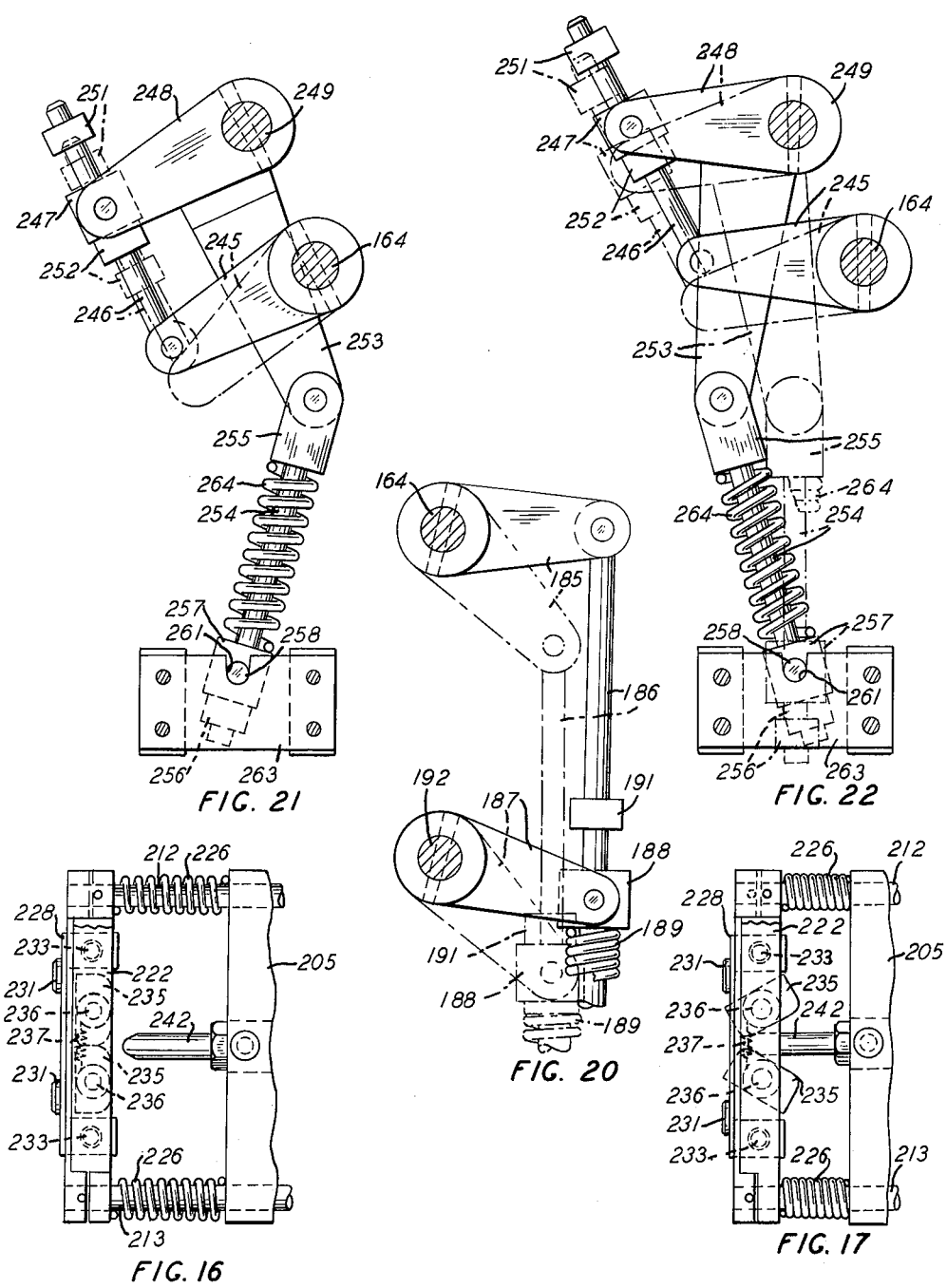

Jan. 25, 1966 G. P. ADAMS ETAL 3,230,608
METHODS AND APPARATUS FOR ASSEMBLING AND SECURING
CONDUCTORS TO TERMINALS OF ELECTRICAL DEVICES
Filed Nov. 17, 1961 20 Sheets-Sheet 14

INVENTORS
G. P. ADAMS
H. E. BRENT
BY /s/ Gundersen
ATTORNEY

INVENTORS
G. P. ADAMS
H. E. BRENT
BY S. Gundersen
ATTORNEY

INVENTORS
G. P. ADAMS
H. E. BRENT
BY S. Gundersen
ATTORNEY

INVENTORS
G. P. ADAMS
H. E. BRENT
BY
ATTORNEY

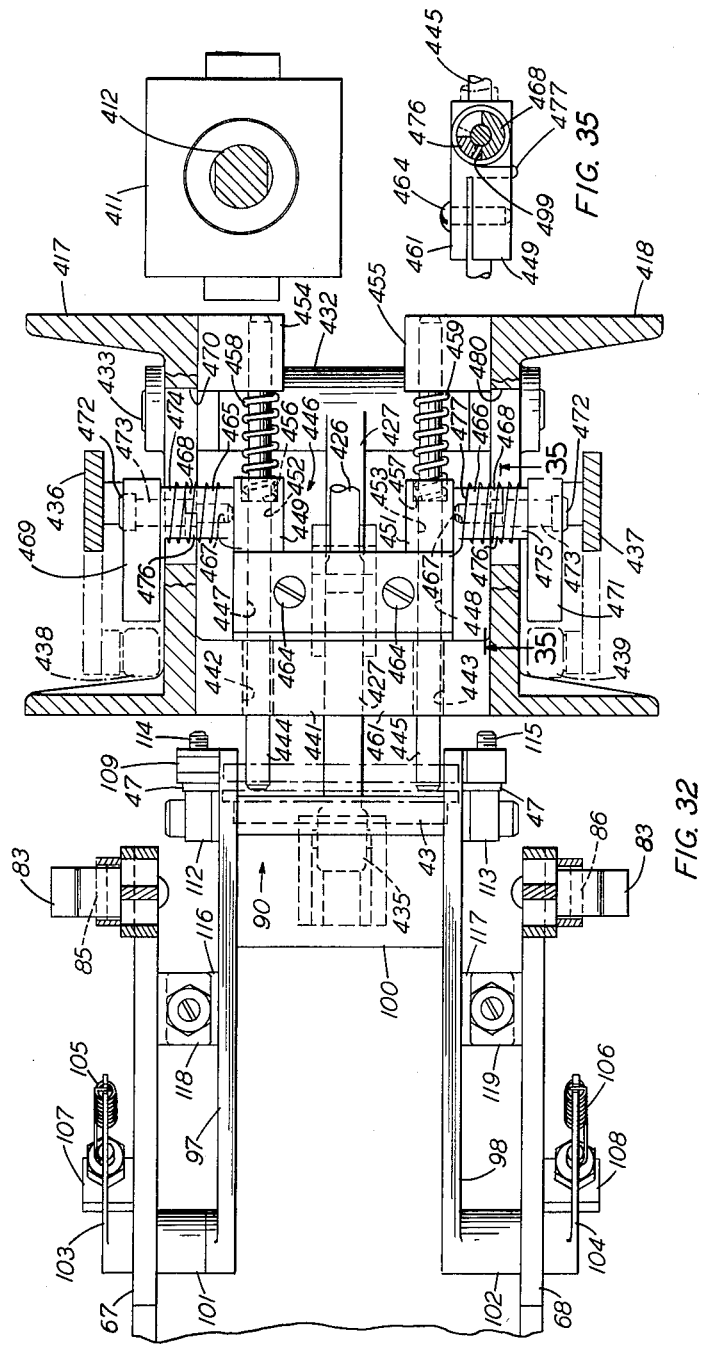

Jan. 25, 1966 G. P. ADAMS ETAL 3,230,608
METHODS AND APPARATUS FOR ASSEMBLING AND SECURING
CONDUCTORS TO TERMINALS OF ELECTRICAL DEVICES
Filed Nov. 17, 1961 20 Sheets-Sheet 20

INVENTORS
G. P. ADAMS
H. E. BRENT
BY *P. Gundersen*
ATTORNEY

United States Patent Office 3,230,608
Patented Jan. 25, 1966

3,230,608
METHODS AND APPARATUS FOR ASSEMBLING AND SECURING CONDUCTORS TO TERMINALS OF ELECTRICAL DEVICES
George P. Adams and Herbert E. Brent, Baltimore, Md., assignors to Western Electric Company, Incorporated, New York, N.Y., a corporation of New York
Filed Nov. 17, 1961, Ser. No. 153,053
12 Claims. (Cl. 29—155.5)

This invention relates to methods and apparatus for assembling and securing conductors to terminals of electrical devices and particularly to methods and apparatus for assembling and securing simultaneously a plurality of stranded conductors of a multiconductor cable to a plurality of terminals of an electrical connector.

An object of the invention is to provide new and improved methods and apparatus for assembling and securing conductors to terminals.

Another object of the invention is the provision of methods and apparatus for automatically and individually assembling a plurality of stranded electrical conductors to a corresponding plurality of terminals of an electrical connector, and soldering the conductors to the terminals.

Still another object of the invention is to sequentially condition conductors for securance to terminals and thereafter securing the conductors to the terminals.

With these and other objects in view, the invention contemplates a method wherein a plurality of stranded conductors are assembled and secured to a corresponding plurality of terminals of an electrical unit wherein the conductors are initially held in a cantilevered fashion while a portion of the insulation is partially removed from the conductors. The areas of the stranded conductors exposed thereby are solidified, as by soldering or other means, and the conductors are then severed in this area to provide a solidified conductor end. The solidified conductor ends are then secured to the terminals.

In accordance with the invention, apparatus is provided for the assembling and securing of conductors to terminals wherein the stranded conductors are initially fanned and spacially clamped to a holding device which is positioned on a carrier. The conductor ends extend from the holding device in a cantilevered fashion away from an edge of the carrier. The connector is also clamped to the holding device. To insure proper alignment of the fanned conductors, a comb is mounted in the holding device and is positioned so that the cantilevered ends of the conductors rest between the teeth of the comb. The carrier is moved to a first work station wherein the cantilevered ends of the conductors are positioned adjacent to an insulation-burning device wherein portions of the insulation are burned from the stranded conductors at a predetermined distance from the ends of the conductors. The carrier is further moved to a second work station wherein the insulation remaining on the stranded conductors between the burned areas and the free ends of the conductors is partially withdrawn to expose a portion of the stranded conductors. Further, a soldering device is actuated to deposit a small amount of solder on the exposed conductor areas thereby tinning and solidifying the areas. The carrier is moved to a third work station wherein a cutting mechanism is actuated to shear the conductors at the exposed, tinned areas thereby providing a cantilevered arrangement of solidified conductor ends. The carrier is further moved to a fourth work station wherein the connector is positioned so that terminals of the connector receive the solidified ends of the stranded conductors therein. A soldering mechanism is actuated to deposit portions of molten solder about each of the assembled conductors and terminals, where, upon cooling of the solder, the conductors are firmly secured to the terminals.

A complete understanding of the invention may be had from the following detailed description from the specific embodiment thereof when read in conjunction with the appended drawings, wherein:

FIG. 6 is a sectional view taken on line 6—6 of FIG. 5 showing a front view of the burning device;

FIG. 7 is a sectional view taken on lines 7—7 of FIG. 5 showing a partial plan view of the burning device;

FIGS. 9 and 10 are partial sectional views taken on line 8—8 showing various positions of a solder feed mechanism for the tinning means;

FIG. 16 is a sectional view taken on line 16—16 of FIG. 8 showing the relative position of a cam and cam followers for controlling an insulation stripping comb which forms a part of the stripping device;

FIG. 17 is a sectional view taken on line 17—17 of FIG. 13 showing the relative operation of the cam and cam follower to remove the comb from an insulation stripping position;

FIG. 20 is a sectional view taken on line 20—20 of FIG. 12 and shows the sequential positioning of a lever control for clamping the stripping device about the insulation;

FIGS. 21 and 22 are sectional views taken on line 21—21 of FIG. 12 showing the sequential positioning of a lever control for retracting the insulation stripping mechanism;

FIG. 23 is a flow diagram showing the relationship between FIGS. 8 and 10 and FIGS. 13 and 10 thereby showing the relative positioning of the solder feed mechanism with respect to the insulation stripping and tinning mechanism;

FIG. 24 is a flow diagram showing the relationship between FIG. 8 and FIG. 9 wherein a controlling lever, shown in phantom lines, of FIG. 8 is connected to the solder feed mechanism which is shown at rest in FIG. 9;

FIG. 32 is a sectional view taken on line 32—32 of FIG. 31 showing a plan view of the assembling device;

FIG. 33 is a partial plan view taken from FIG. 32 showing a portion of a connector retarding device in a retracted position;

FIG. 35 is a sectional view taken on line 35—35 of FIG. 32 showing a specific feature of the camming device for retracting the connector retarding device;

GENERAL DESCRIPTION

Figure 36:
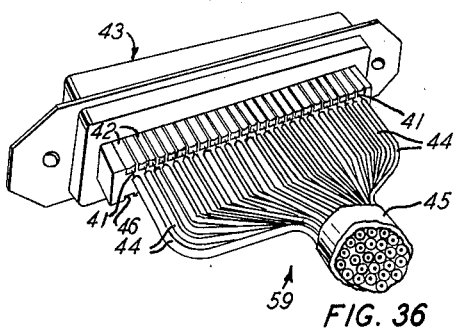
FIG. 36 is a perspective view showing the completed product wherein the conductors are secured to the terminals of the connector.

The present invention contemplates the assembling of a plurality of stranded conductors 41 (FIG. 36) to a corresponding plurality of U-shaped terminals 42 of an electrical connector 43 such as a quick-connect plug. The conductors 41 are provided with an insulating coating 44 and are combined to form an insulated cable 45. The opposite side of the connector 43 is provided with a female portion having inner terminals corresponding to the terminals 42 where the conductors 41 are assembled and secured to the terminals 42. In addition, a corresponding row of terminals 46 are provided adjacent to the terminals 42 for securing another group of conductors thereto. Further, the connector 43 is provided with a flange 47 for fastening purposes.

Figure 1:
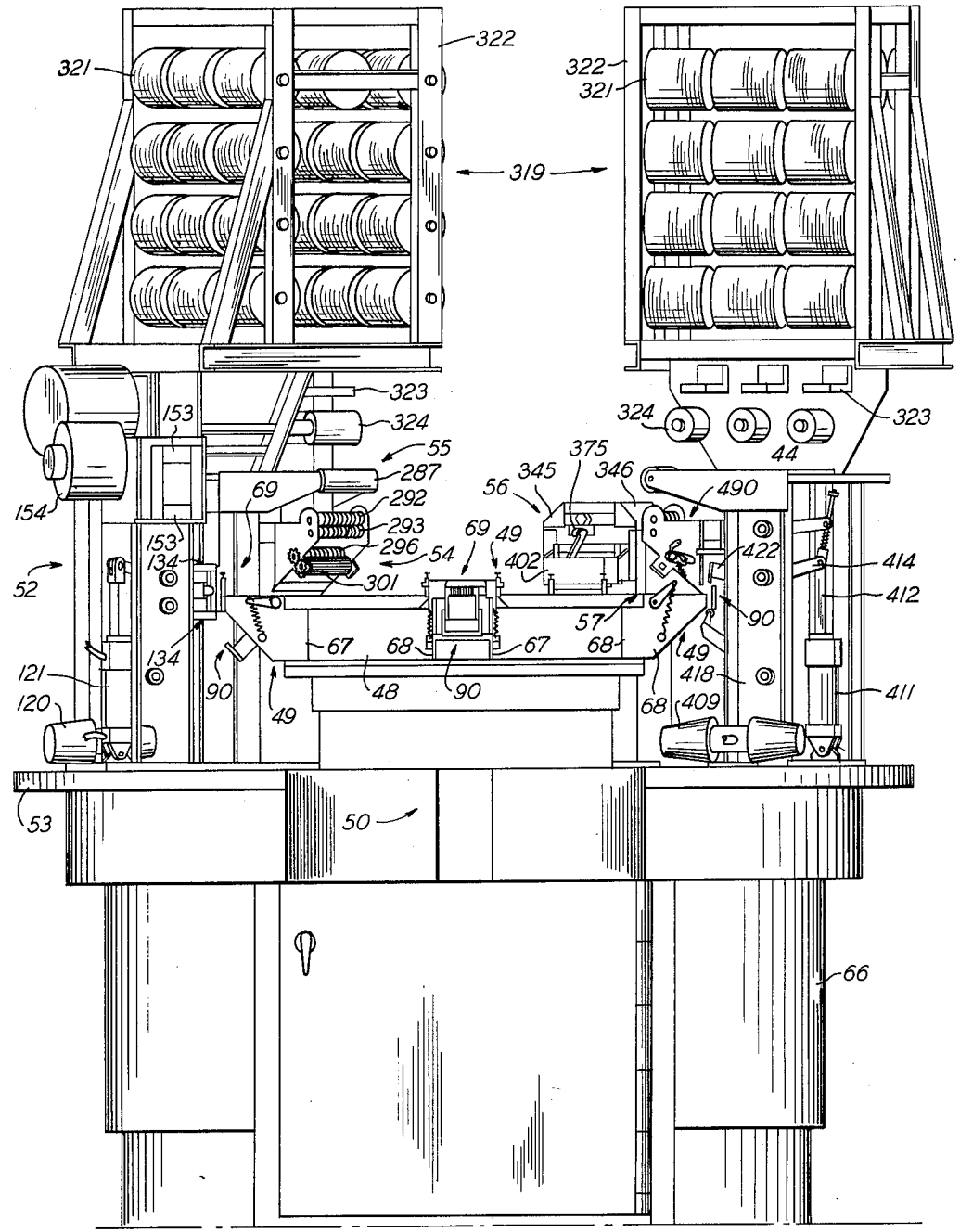
FIG. 1 is a front elevational view of an apparatus for assembling and securing a plurality of stranded conductors to a corresponding plurality of terminals of a connector embodying some of the principles of the present invention.
Figure 2:
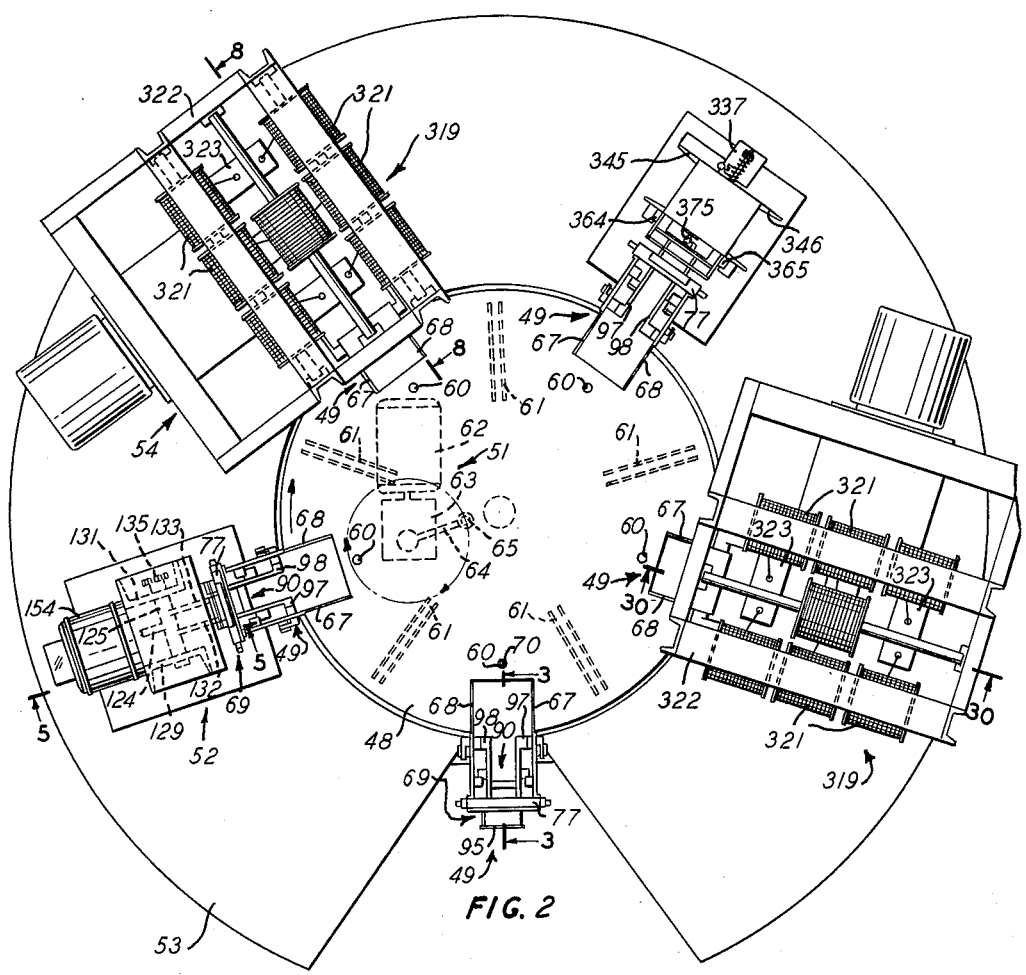
FIG. 2 is a plan view of the assembling and securing apparatus shown in FIG. 1 revealing four work stations for burning insulation, stripping and tinning the conductors, cutting the conductors, and assembling and securing the conductors to the connector.

As shown in FIGS. 1 and 2, an apparatus is designed for assembling and securing the conductors 41 to the terminals 42 wherein a carrier, such as a turntable 48, is provided with a plurality of holding fixtures, designated generally by the reference numeral 49. An operator positions the holding fixture 49 adjacent to a loading station, designated generally by the reference numeral 50, and clamps the insulated conductors 41 to the holding fixture 49 so that the ends of the conductors 41 extend away from the table 48 in a cantilevered fashion. In addition, the operator also clamps the connector 43 in a separate position in the holding fixture 49. The table 48 is rotated by a Geneva mechanism, designated generally by the reference numeral 51, to a first work station, designated generally by the reference numeral 52, which is positioned on a stationary circular table 53 provided with a central cut-out to receive the turntable 48 therein. At the first work station 52, a portion of the insulation 44 is burned from the conductors 41 a predetermined distance from the cantilevered ends of the conductors 41 thereby resulting in a strip of free insulation remaining between the burned area and the conductor ends. Simultaneously, the operator clamps another plurality of conductors 41 and a connector 43 to another holding fixture 49. Upon completion of the burning operation, the turntable 48 is indexed so that the original holding fixture 49 is advanced to a second work station, designated generally by the reference numeral 54, wherein the free insulation 44 remaining between the burned area and the ends of the conductors 41 is partially withdrawn from the conductors 41 thereby exposing a portion of the conductors 41 and retaining the strands in a substantially grouped arrangement. A solder feed device, designated generally by the reference numeral 55, advances a plurality of strips of solder, or other suitable binding material, adjacent to the corresponding exposed areas of the conductors 41 whereupon a soldering device deposits the solder in a molten form onto the exposed areas of the conductor thereby solidifying the exposed areas upon cooling of the solder. The turntable 48 is indexed to a third work station, designated generally by the reference numeral 56, whereupon a cutting mechanism is actuated to sever the plurality of conductors 41, in a traversing fashion, along the exposed tinned areas of the conductors 41. Further indexing of the turntable 48 positions the holding fixture 49 adjacent to a fourth work station, designated generally by the reference numeral 57, wherein the U-shaped terminals 42 of the connector 43 are positioned in an assembled relation with the corresponding plurality of tinned conductors 41. A soldering mechanism, designated generally by the reference numeral 58, is actuated to deposit solder on the assembled conductors and terminals thereby securing the plurality of conductors 41 to the corresponding terminals 42 of the connector 43. The turntable 48 is then indexed to the loading station 50 where the operator removes the completed product 59. It is to be noted that, as each operation is being performed at the successive work stations, the operator is clamping successive pluralities of conductors 41 and a connector 43 to another holding fixture 49.

DRIVING SYSTEM

As shown in FIG. 2, the turntable 48 is provided with a plurality of slotted tracks 61 radially mounted on the underside of the table 48. Also, positioned beneath the turntable but not mounted thereto is a motor 62 which is driving a gear system 63 thereby controlling the rotation of a disc 64 which is coupled to the gear system 63. A cam roller 65 is mounted on the upper surface of the disc 64 and engages one of the plurality of slots 61 upon each revolution of the disc 64 to index the table 48 from one work station to another work station. It is to be noted that the turntable 48, the stationary table 53 and the driving mechanism therefor are conventional units.

As shown in FIG. 1, the turntable 48 is mounted within a support 66 which also supports the stationary circular table 53 and provides a housing for the driving system 51. In addition, the turntable 48 is provided with a series of radially spaced apertures 60 which are positioned to receive a resiliently controlled pin 70 at the loading station 50 thereby providing a locking feature for the table 48 as the operations are being performed at the various work stations.

Figure 37:
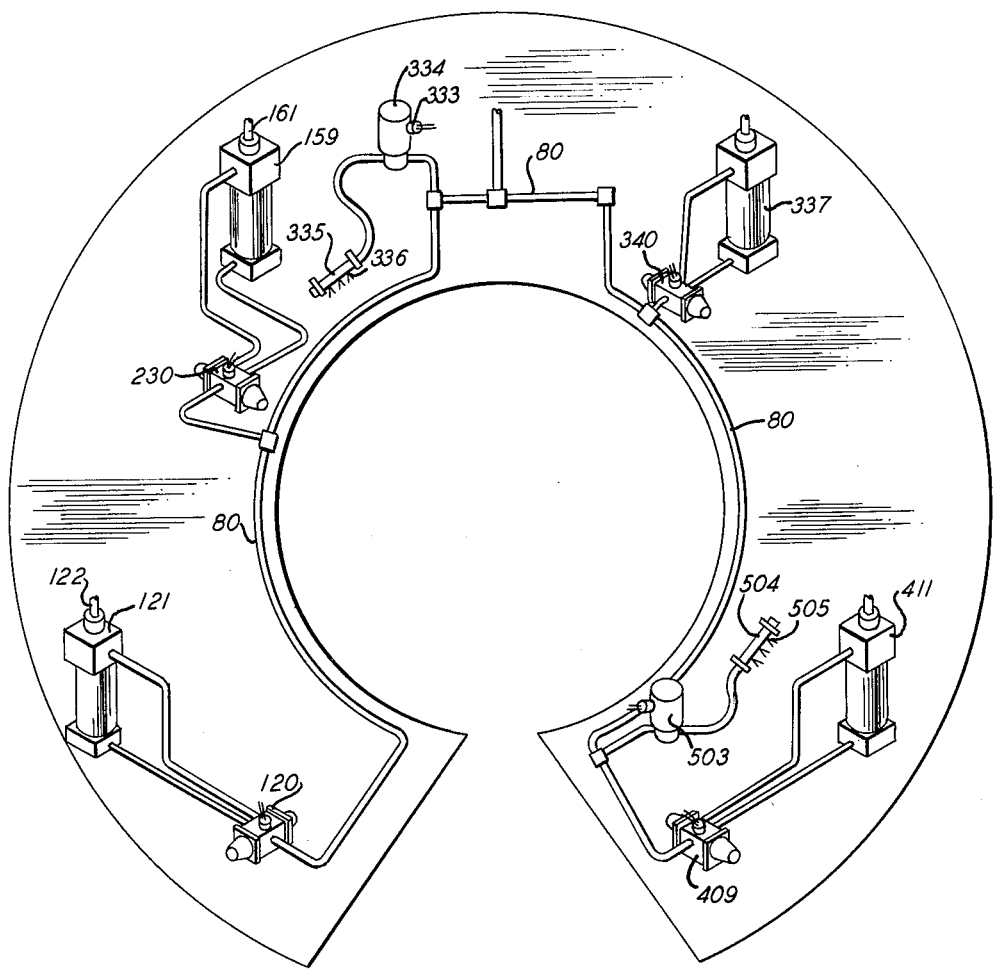
FIG. 37 is a diagrammatic view of a hydraulic system for controlling the operation of the various elements shown in the above figures.

In addition to the driving system, a plurality of hydraulic lines 80, as shown in FIG. 37, are provided for supplying air pressure to the various components at each work station wherein the air supply is not shown.

HOLDING FIXTURE

Figure 3:
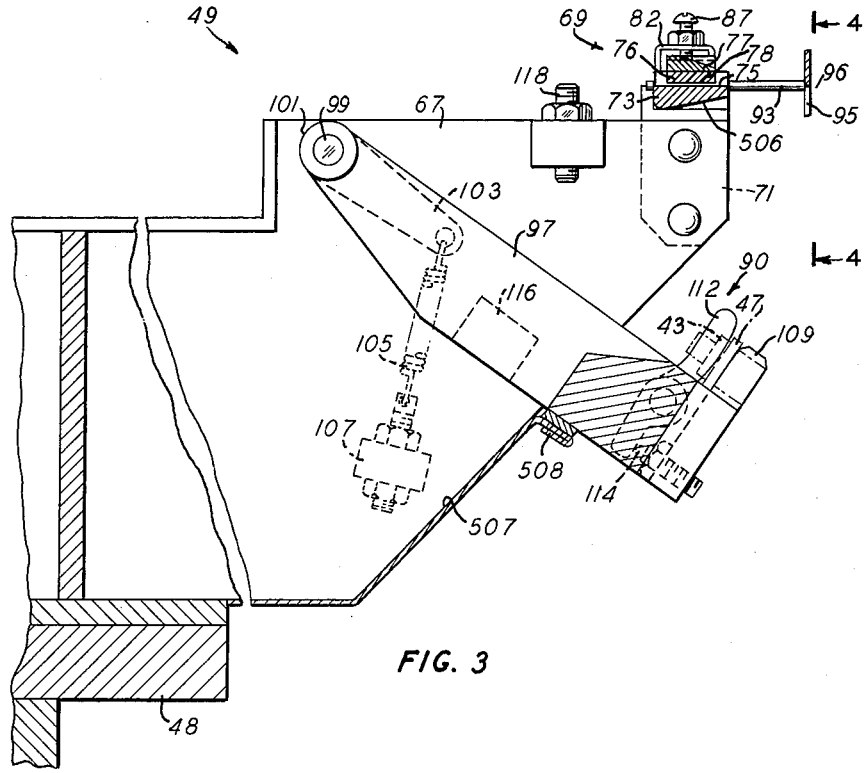
FIG. 3 is a sectional view taken on line 3—3 of FIG. 2 showing a side view of a holding fixture for receiving the plurality of conductors and the connector.
Figure 4:
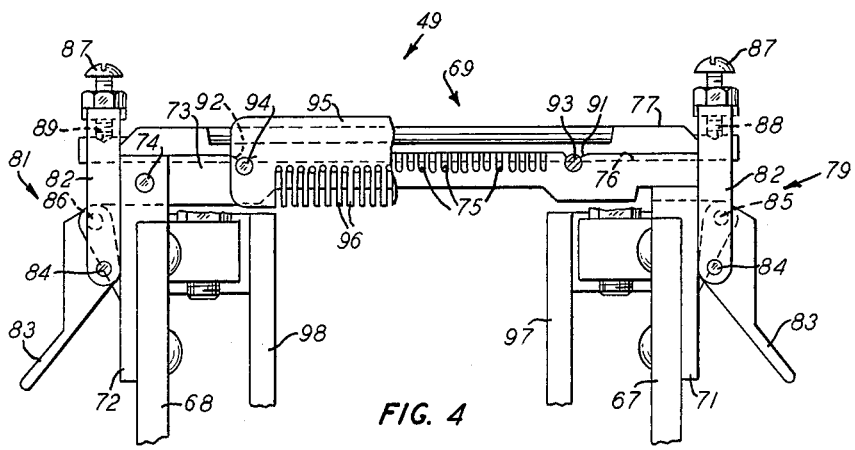
FIG. 4 is a sectional view taken on line 4—4 of FIG. 3 showing a front view of the conductor holder.

As shown in FIGS. 1 through 4, inclusive, and FIG. 32, the holding fixture is supported by a pair of vertical plates 67 and 68 which are mounted on and extend from the turntable 48. Positioned between the upper free ends of the vertical plates 67 and 68, is a conductor holder, designated generally by the reference numeral 69. The conductor holder 69 is provided with a pair of vertical extensions 71 and 72 mounted on the vertical plates 67 and 68, respectively. The vertical extensions 71 and 72 are provided with a bifurcated upper portion for receiving a bottom, wire-holding plate 73 therebetween. In addition, the bottom plate 73 is pivotally mounted between the bifurcated sections of the vertical extensions 72 by means of a pin 74 and is further provided with a series of grooves 75 for receiving the conductors 41 therein. As shown in FIG. 3, the bottom plate is provided with a traversing slot 76 for receiving a top clamp 77. The top clamp 77 is provided with a strip of neoprene rubber 78 on the underside thereof to insure a resilient clamping action upon the conductors 41 which are positioned within the grooves 75. Pivotally mounted on the vertical extensions 71 and 72 are a pair of toggle clamps, generally designated by the reference numerals 79 and 81, respectively. A J-shaped member 82 is pivotally mounted to a lever 83 at a pivot point 84. The lever 83 is also pivotally mounted to the extensions 71 and 72 about fixed pivot points 85 and 86, respectively. A clamping screw 87 is positioned in the cross leg of each of the J-shaped members 82 and is provided with a pointed end for engagement with a pair of depressions 88 and 89 in the top plate 77. Therefore, the toggle clamps 79 and 81 are positioned so that the clamping screws 87 engage the slots 88 and 89 of the top plate 77 after the top plate 77 has been positioned atop the bottom plate 73 where, upon inward pivotal motion of the levers 83, the J-shaped members 82 are urged in a generally parallel fashion alongside the vertical extensions 71 and 72 thereby clamping the top plate 77 to the bottom plate 73. Additionally, the top plate 77 and the bottom plate 73 are each provided with a pair of mating, semicircular grooves 91 and 92 for receiving the extended arms 93 and 94, respectively, of a wire-aligning comb 95, wherein the comb 95 is provided with a plurality of teeth 96 for receiving the plurality of cantilevered portions of the conductors 41 therebetween.

As viewed in FIGS. 3 and 32, piovtally mounted to the vertical supports 67 and 68 are a pair of connector holding arms 97 and 98, respectively, which support a connector nest, designated generally by the reference numeral 90. Each of the arms 97 and 98 is positioned about a shaft 99 which also has positioned thereabout a pair of hubs 101 and 102, respectively. Mounted between the arms 97 and 98, near the free ends thereof, is a lift support plate 100. The hubs 101 and 102 extend through a pair of openings in the vertical supports 67 and 68 and are further provided with arms 103 and 104, respectively. Each of the arms 103 and 104 is connected to a pair of tension springs 105 and 106, respectively, which is connected at the opposite ends thereof to a pair of fixed blocks 107 and 108, thereby biasing the arms 97 and 98 in a downward position, as shown in FIG. 3. The free ends of each of the arms 97 and 98 are provided with a pair of back plates 109 and 111, respectively, for receiving the connector 43 and the flanges 47 thereof. Further connected to the free ends of each of the arms 97 and 98 is a pair of pivotal clamps 112 and 113, respectively, which is resiliently urged into engagement with flange 47 of the connector 43 by a pair of spring-loaded plungers 114 and 115, respectively. Mounted intermediate the ends of the arms 97 and 98 is a pair of stop-engaging blocks 116 and 117, respectively. A pair of stops 118 and 119 is mounted on the inner walls of the supports 67 and 68 and is provided for engaging the blocks 116 and 117 upon pivotal movement of the connector holding arms 97 and 98, thereby properly positioning the connector 43 with respect to the conductors 41.

FIRST WORK STATION

Insulation burning

Upon proper positioning of the conductors 41 and the connector 43 in the holding fixture 49, the operator actuates the driving system to index the turntable 48, and hence the holding fixture 49, to the first work station 52. At the first work station 52, as viewed in FIGS. 5, 6, and 7, an air cylinder 121, which is operated through the operation of a solenoid valve 120 (FIG. 37) is provided with a piston rod 122 extending therefrom wherein the rod is formed with a yoke 123 at the free end thereof for receiving one end of a lever 124 therebetween. The other end of the lever 124 is formed centrally on a hub 125 which is coaxially mounted on a shaft 126 and fastened for rotation thereto by set screws 127. Shaft 126 is rotatably mounted within a pair of bearings 128 which are fixedly mounted in a pair of vertical supports 129 and 131. A pair of heater holding arms 132 and 133 extends from the hub 125 and is provided at the free end thereof with a portion of the insulation burning device, generally designated by the reference numeral 134. Keyed to one end of the shaft 126 is a gear 135 which meshes with a second gear 136. The second gear 136 is keyed to a shaft 137 which is mounted for rotation in a pair of bearings 138 fixedly mounted in the vertical supports 129 and 131. Coaxially mounted on the shaft 132 and between the bearings 138 is a hub 139 having a pair of heater holding arms 141 and 142 extending therefrom. Positioned on the free ends of the arms 141 and 142 is another portion of the burning device 134. Specifically mounted on the free ends of each of the pairs of arms 132, 133 and 141, 142 is a plate 143 which supports an insulation block 144 threadedly fastened thereto. The insulation blocks 144 are each provided with a groove 145 for receiving a nichrome wire 146. The insulation blocks 144 of each portion of the burning device 134 are mounted on the plates 143 in such a fashion that each of the grooves 145, which supports the nichrome wires 146, is in an opposing relationship. One end of each of the nichrome wires 146 is brazed to a terminal strip 147 wherein each of the terminal strips 147 is mounted on the insulation blocks 144. The opposite ends of the nichrome wires 146 are fastened to a member 148 which is pivotally mounted intermediate the ends thereof to the insulation blocks 144. Each of the free ends of the pivotal members 148 is fastened to one end of a pair of tension springs 149 wherein the opposite ends of the springs are fastened to posts 151 which are mounted on the blocks 144. Thus, it is easily seen that the biasing action of the springs 149 contains the nichrome wires 146 in the grooves 145 of the insulation blocks 144. As previously discussed, each of the nichrome wires 146 is brazed at one end thereof to the terminal strips 147 and at the opposite end thereof to the terminal strips 152 which are mounted on the pivotal member 148. The terminal strips 147 and 152 are electrically connected to a pair of transformers 153 (FIG. 1) through a Variac control 154, thereby providing the electrical energy required for heating the nichrome wires 146. A bar 155 is fixedly mounted between the vertical supports 129 and 131 for providing a support for a stop screw 156. Mounted on the piston rod 122 is a magnet 157. A switching element 158 is fixedly mounted to the vertical support 129 adjacent to the path of travel of the piston rod 122. A second switching element (not shown) is also positioned adjacent to the path of travel of the piston rod, but in a lower position with respect to that of the switching element 158 as shown in FIG. 7.

As the holding fixture 49 positions the cantilevered ends of conductors 41 at the first work station 52, the air cylinder 121 is operated through the actuation of the solenoid 120 to rotate the gear 135, which, in turn, drives the gear 136 to pivot the arms 133 and 142 into a position wherein the nichrome wires 146 engage, in a traversing manner, a portion of the insulation 44 of the cantilevered ends of the conductors 41. Simultaneously, an electrical circuit (not shown) is actuated to provide sufficient electrical energy to the transformers 153 to heat the wires 146 whereupon the insulation is burned from the conductors 41 in the area of the nichrome wires 146. It is to be noted that the stop 156 prevents the arms 133 and 142 from being further pivoted thus providing a means for insuring a spaced relation between the nichrome wires 146. In this manner, only the insulation 44, and not the conductors 41, is burned by the nichrome wires 146. As the piston rod 122 and the magnet 157 reach a predetermined distance of travel, the magnet 157 actuates a switch 158 which, after a predetermined dwell, will reverse the actuation of the solenoid 120 thereby de-activating the air cylinder 121 to pivot the arms 133 and 142, and hence the nichrome wires 146, from the area of the conductors 41. As the piston rod 122 approaches the lowermost point of travel (as viewed in FIG. 7) the magnet 157 actuates a second switching element (not shown) thereby enabling an electrical circuit, which controls the indexing of the turntable 48, for operation upon the actuation of a switch by the operator. It is noted that the second switching element provides a safety feature wherein the turntable 48 will not rotate upon actuation of the switch by the operator until the second switch element has been actuated.

SECOND WORK STATION

*Stripping and tinning*

During the burning operation, the operator is positioning a second group of conductors 41 and a second connector 43 in a second holding fixture 49 at the loading station 50. Upon completion of the burning operation, the operator actuates the Geneva mechanism 51 to index the table 48 so that the first holding fixture 49 is positioned adjacent to the second work station 54 (FIG. 2) wherein the insulation 44 is partially stripped from the conductors 41 and the conductor areas exposed thereby are tinned. Simultaneously, the second holding fixture 49 is positioned adjacent to the first work station 52, wherein the previously described burning operation is initiated.

As viewed in FIGS. 8, and 12 through 22, inclusive, an air cylinder 159 is positioned at the second work station 54 and is provided with a piston rod 161 extending therefrom where the rod 161 is provided with a yoke 160 at the free end thereof. A lever 162 is connected at one end thereof to the yoke 160 and at the opposite end thereof to a hub 163 which is coaxially positioned about a shaft 164 and is fixedly mounted to the shaft by means of a set screw 165. A pair of hubs 166 and 167 is coaxially mounted on the shaft 164 on each side of the ends of the hub 163 and is positioned for free rotation about the shaft 164. A pair of arms 168 and 169 extends from the hubs 166 and 167, respectively, and forms a support 171 for a heater housing 172 which further provides a support for a soldering bar 173 mounted thereon. A heater unit 174 is mounted within the heater housing 172 for providing heat for the soldering bar 173. An arm 175 extends from the hub 163 and is positioned so that the free end thereof is adjacent to the upper portion of the support 171. As viewed in FIGS. 17 and 18, a bolt 176 is utilized to fasten the arm 175 to the support 171. In addition, a second bolt 177 cooperates with a nut 178 to provide an adjusting feature between the support 171 and the arm 175. It is to be noted that this adjusting feature determines the positioning of the soldering bar 173 during the tinning operation.

The shaft 164 extends through and is supported by the pair of bearings 179 and 181 which is mounted in a pair of vertical supports 182 and 183, respectively. Coaxially and fixedly positioned about one 184 of the shaft 164 is a lever 185 which is further fastened at the free end thereof to a rod 186. A lever 187 is slidably fastened to the rod 186 by means of a sliding block 188 mounted on the shaft portion of the rod 186. A compression spring 189 is positioned about the free end of the rod 186 and is held between the block 188 and a disc 190 for biasing the sliding block 188. Further, a block 191 is fixedly positioned on the rod 186 and engages the sliding block 188 providing motion therefor upon movement of the rod. Coaxially positioned within an opening at the opposite extremity of the lever 187 is a shaft 192 which is further coaxially positioned within a pair of bearings 193 and 194 in the vertical supports 182 and 183, respectively. Thus, as the shaft 164 pass is rotated, the lever 185 is pivoted to move with rod 186 thereby moving the lever 187 to rotate the shaft 192.

Figure 8:
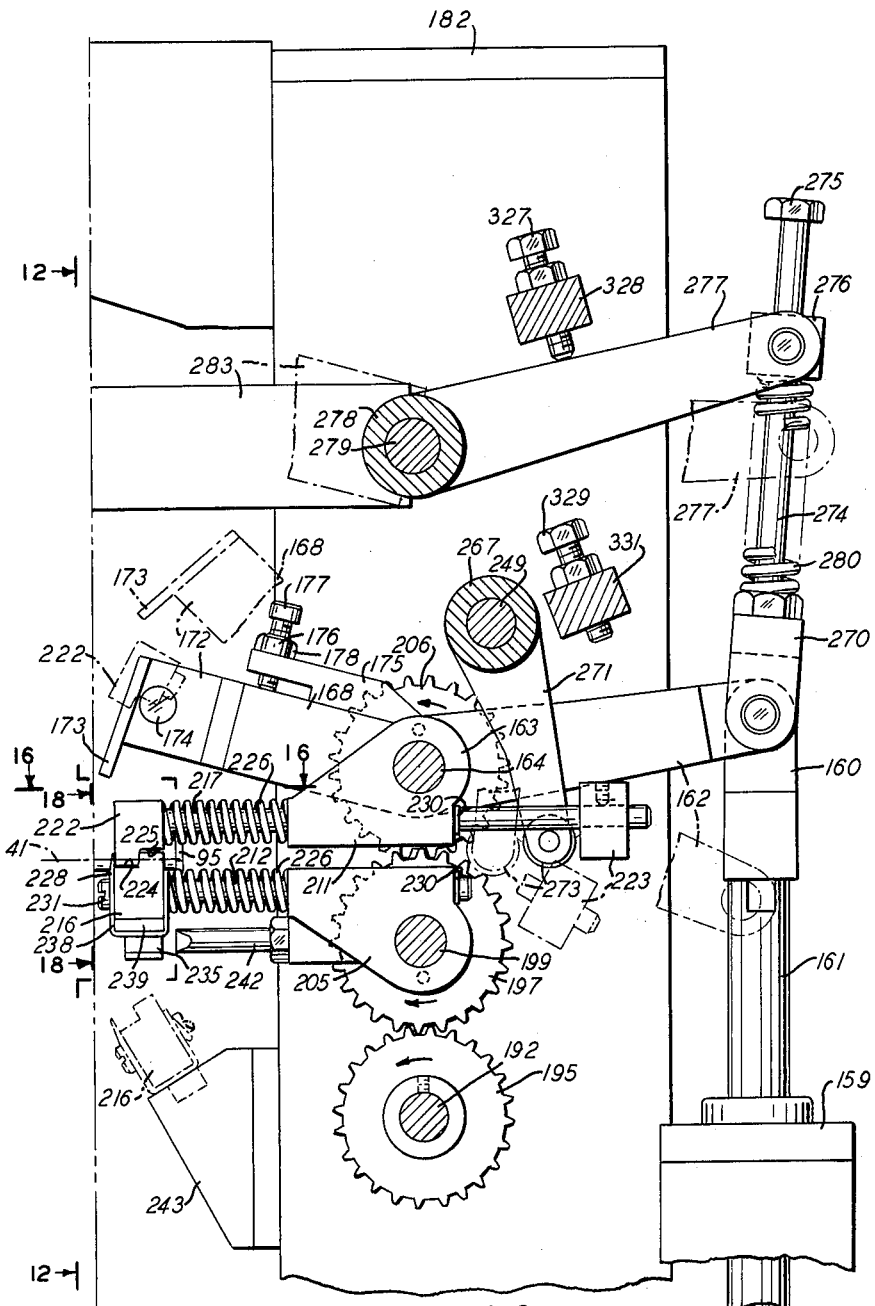
FIG. 8 is a partial sectional view taken on line 8—8 of FIG. 2 showing various positions of an insulation stripping apparatus and a conductor tinning means.
Figure 26:
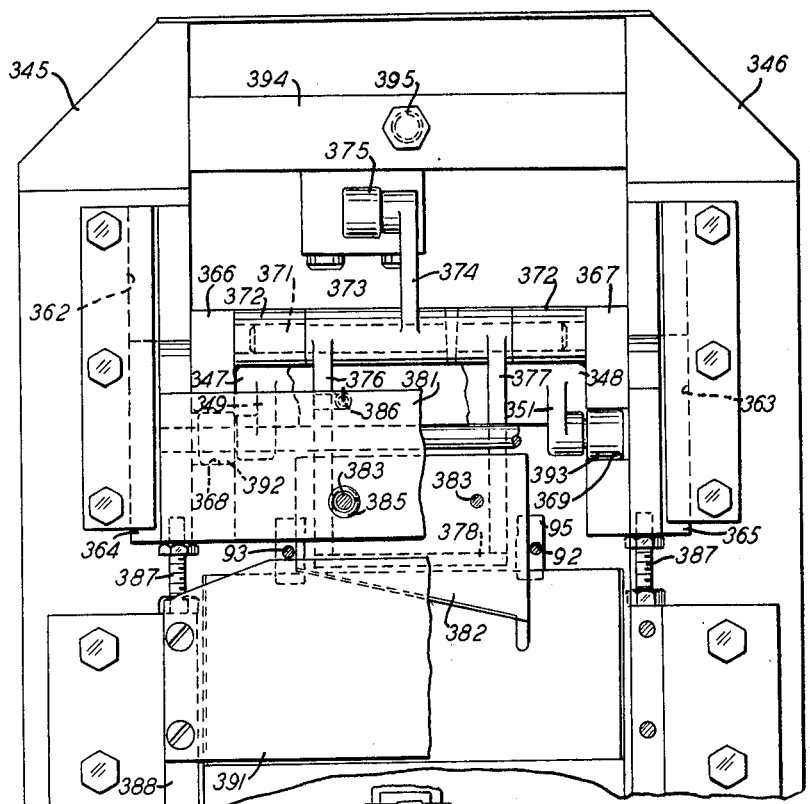
FIG. 26 is a sectional view taken on line 26—26 of FIG. 25 showing a front view of the cutting mechanism.
Figure 12:
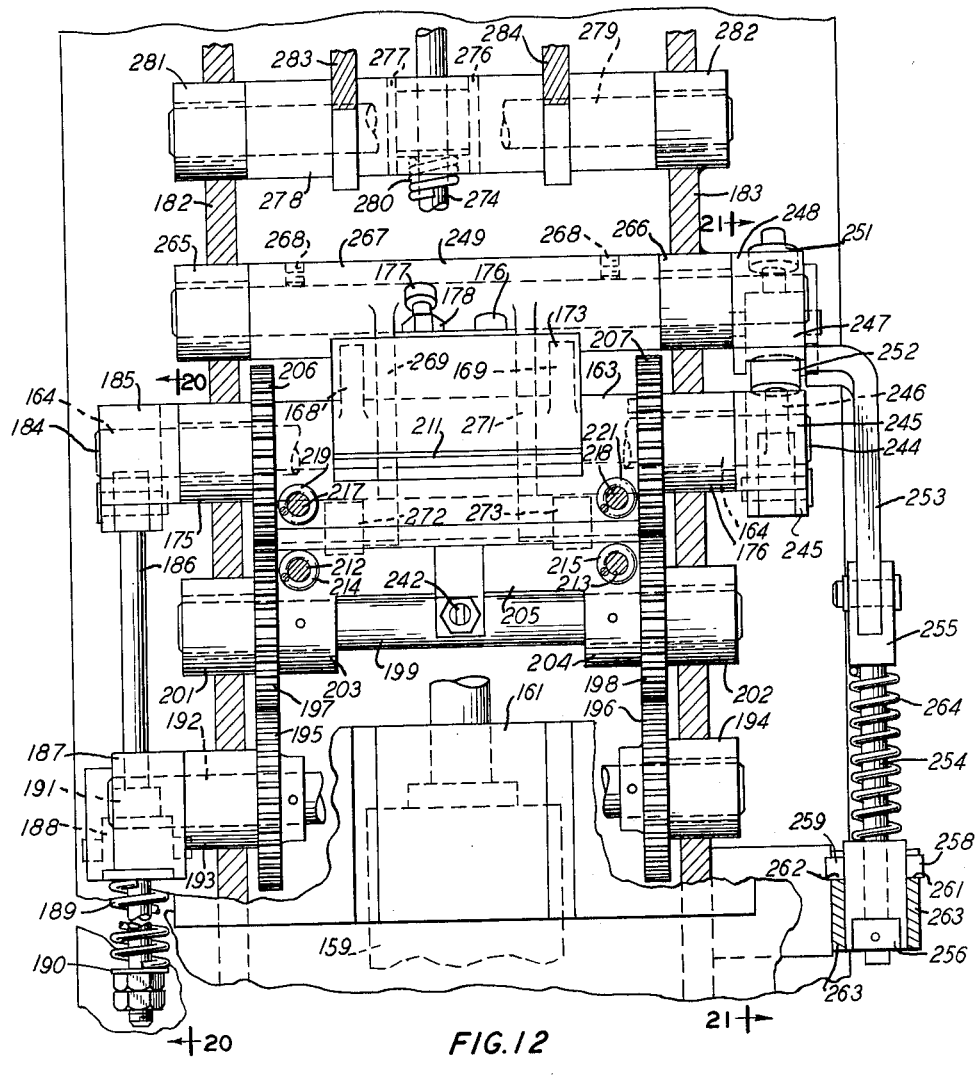
FIG. 12 is a sectional view taken on line 12—12 showing a partial front view of the insulation stripping device and the tinning means.

As shown in FIGS. 8 and 12, a pair of gears 195 and 196 is coaxially and fixedly mounted on the shaft 194 to rotate therewith and is positioned adjacent to the bearings 193 and 194, respectively. The gears 195 and 196 mesh with a second pair of gears 197 and 198, respectively, which are coaxially and freely mounted about a shaft 199 which is mounted in a pair of bearings 201 and 202 in the vertical supports 182 and 183, respectively. The gears 197 and 198 are keyed to a pair of parallel, spaced arms 203 and 204, respectively, of a clamp support 205. A third pair of gears 206 and 207 meshes with the gears 197 and 198, respectively, and is coaxially but freely mounted about the shaft 164 and is keyed to a pair of parallel, spaced arms 208 and 209, respectively, of a second clamp support 211. A pair of rods 212 and 213 is slidably mounted within a pair of apertures 214 and 215, respectively, in the clamp support 205. A clamping member 216 is transversely mounted on the forward free ends of the rods 212 and 213. A second pair of rods 217 and 218 is slidably mounted within a pair of apertures 219 and 221, respectively, in the second clamp support 211. A clamping member 222 is transversely mounted on the forward free ends of the rods 217 and 218, and a crossbar 223 is mounted transversely on the opposite free ends of the rods 217 and 218. The clamping members 216 and 222 are provided with cutaway portions 224 and 225, respectively, thereby providing a companion mating of the clamping members as they are urged together. Coaxially positioned about the rods 212, 213, 217 and 218 are compression springs 226 which are held between the clamp supports 205 and 211 and the clamping members 216 and 222. Each of the clamping members 216 and 222 is provided with a neoprene rubber lining 227 for providing resilient engagement by the clamp with the stripped insulation therebetween. It is to be noted that each of the rods 212, 213, 217 and 218 is provided with a rib 230 to limit the movement of the rods to the left, as viewed in FIG. 13.

Referring now to FIGS. 8 and 16 through 19, inclusive, a U-shaped plastic comb 228, provided with a plurality of teeth 229, is positioned about the clamping member 216 by means of a pair of screws 231 positioned in a pair of slots 232 formed in the comb 228. A pair of compression springs 233 is positioned in a pair of apertures 234 formed in the underside of the clamping member 216. A pair of cam followers 235 is mounted for rotation on pins 236 which are fixedly positioned within the clamping member 216 wherein the cam followers 235 are resiliently held by a tension spring 237. A pair of base legs 238 of the U-shaped portion of the comb 228 is positioned below the springs 233 and each provides an enclosure for a pair of spacers 239 which retains the springs 233 within the apertures 234. The spacers 239 extend from between the base legs 238 and the clamp support 205 and rest on shoulders 241 of the cam followers 235, thereby holding the comb 228 in a position, as shown in FIG. 8, against the biasing action of the springs 233. A cam 242 is mounted on the clamp support 205 and extends in a plane substantially between the cams 235.

Hence, as the turntable 48 is turned to position the cantilevered portions of the conductors 41 adjacent to the second work station 54, the air cylinder 159 is operated through the actuation of a solenoid valve 230 to rotate the clamp supports 205 and 211 by activation of the mechanism as previouly described, and hence, pivots the clamping member 216 and the comb 228 from atop a rest 243 which is mounted on the vertical supports 182 and 183, and, further, pivots the clamping member 222 into mating engagement about the free insulation remaining on the cantilevered portions of the conductors 41. The comb 228 is positioned so that the portions of the conductor 41, which were bared during the burning operation, are inserted between the teeth 229 of the comb 228. It is to be noted, as shown in FIG. 20, that the spring 189 provides a biasing action where, upon further movement of the rod 186, the spring is further compressed to substantially increase the clamping of members 216 and 222 about the free insulation 44.

Figure 14:
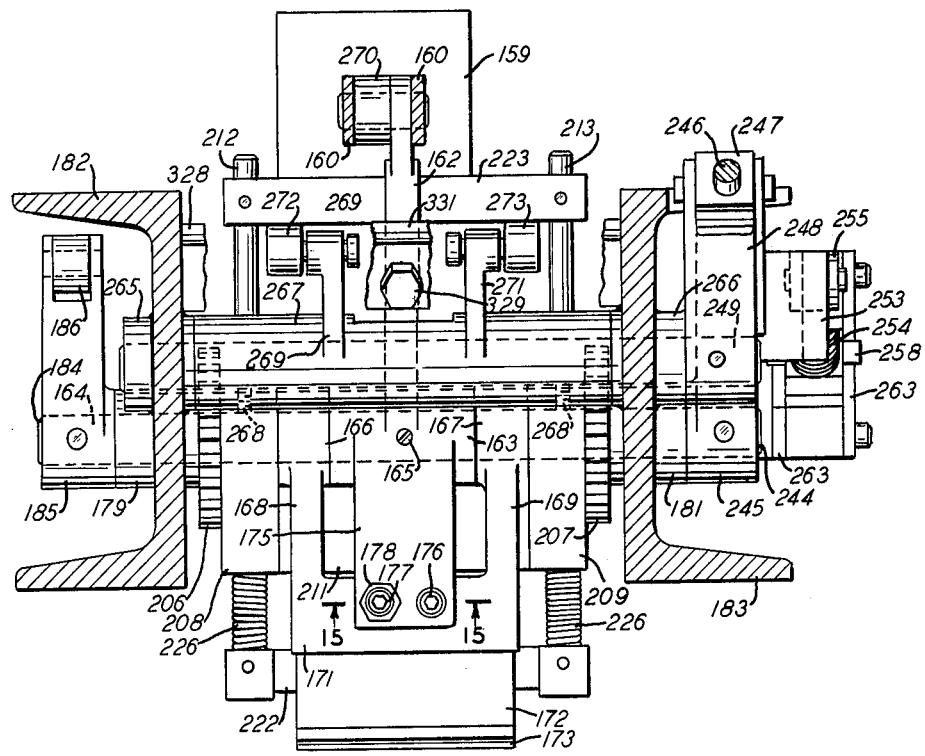
FIG. 14 is a sectional view taken on line 14—14 of FIG. 13 showing a plan view of the insulation stripping and tinning devices in a final operative position.

As shown in FIGS. 14, 21 and 22, at an opposite extremity 244 of the shaft 164, a lever 245 is mounted for rotation thereon. A rod 246 is fastened to the free end of the lever 245 and is adapted to be moved by the lever 245 as the shaft 164 rotates. A block 247 is slidably positioned on the rod 246 and is further connected to a lever 248 which is coaxially and fixedly mounted about a shaft 249. A pair of blocks 251 and 252 is fixedly and spacially positioned on the rod 246 for engaging and moving the block 247 during the sequence of the stripping and tinning operations. A lever arm 253 extends from the lever 248, as viewed in FIGS. 12, 14, 21 and 22, and is pivotally connected to a rod 254 through a yoke 255. The rod is provided at the opposite extremity thereof with a fixedly mounted block 256. Positioned intermediate the ends of the rod 254 is a second block 257 which is provided with a pair of pins 258 and 259 extending in a transverse relation with respect to the rod 254. The pins 258 and 259 rest in a pair of grooves 261 and 262, respectively, which is formed in a pair of support plates 263. A compression spring 264 is coaxially positioned about the rod 254 and is held between the yoke 255 and the block 257.

The shaft 249 is coaxially mounted within a pair of bearings 265 and 266 which is fixedly mounted within the vertical supports 182 and 183, respectively. A hub 267 is fixedly and coaxially mounted about the shaft 249 by means of set screws 268 in a position between bearings 265 and 266. Extending from the hub 267 is a pair of arms 269 and 271 which is provided with rollers 272 and 273, respectively, on the free ends thereof.

Figure 13:
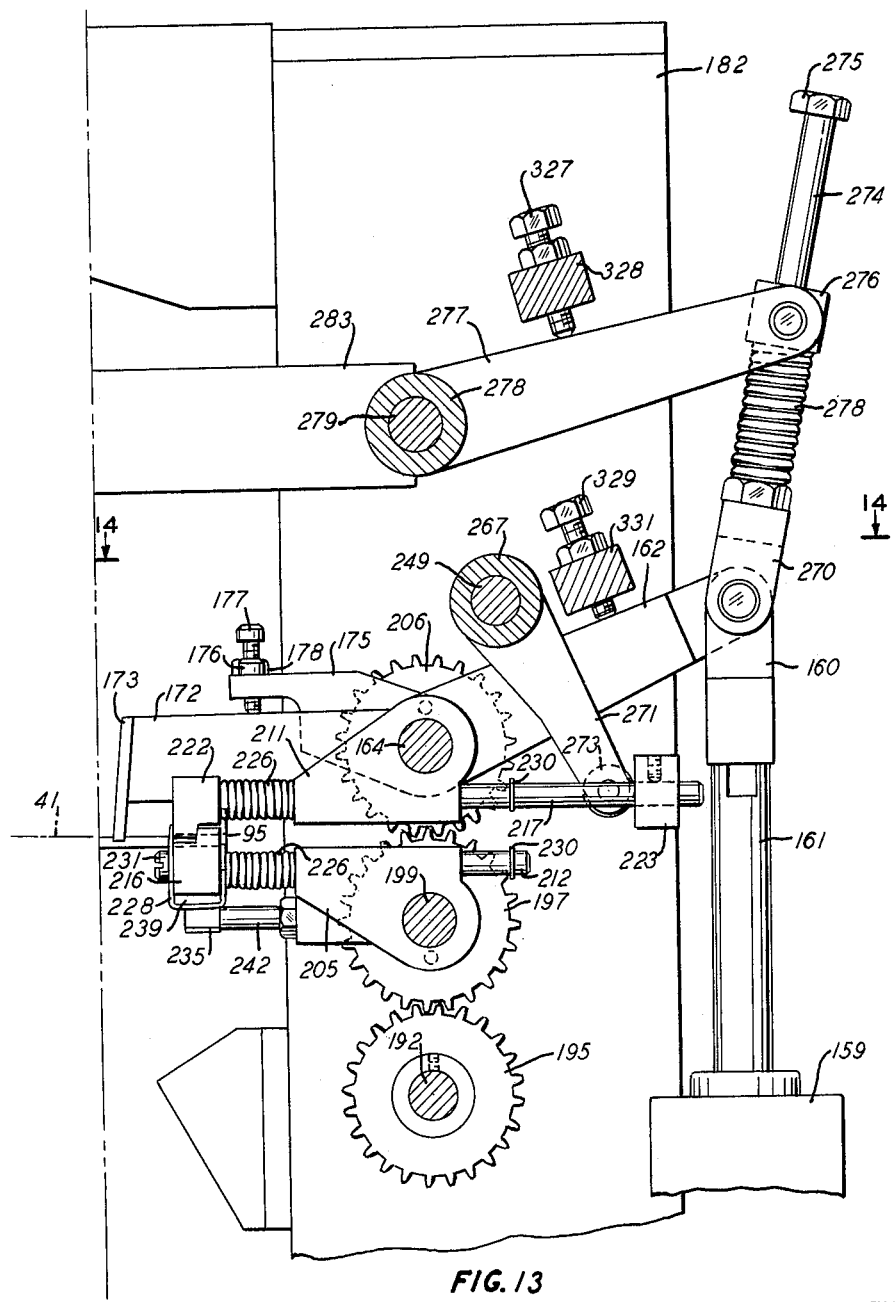
FIG. 13 is a side view of the insulation stripping and tinning devices in a final operative position.

Referring to FIGS. 8, 21 and 22, as the shaft 164 is rotated the lever 245 is pivoted wherein the block 252 moves a short distance before engaging the slidable block 247. The movement of block 247 initiates the pivoting of the lever 248 and hence the rotation of the shaft 249 whereupon the lever 253 moves through a series of positions, as shown in FIGS. 21 and 22. Referring to FIG. 8, as the shaft 249 rotates, as previously described, the arms 269 and 271 are pivoted so that the rollers 272 and 273 engage the crossbar 223 to slidably move the rods 212 and 217 within the clamp supports 205 and 211, and, hence, move the previously closed clamping members 216 and 222 and the comb 228 in a rearward position, as shown in FIG. 13. In this manner, the free insulation remaining on the cantilevered portions of the stranded conductors 41 is partially stripped from the conductors thereby exposing a larger area of each conductor 41 and retaining the strands in a substantially grouped relation.

Figure 11:
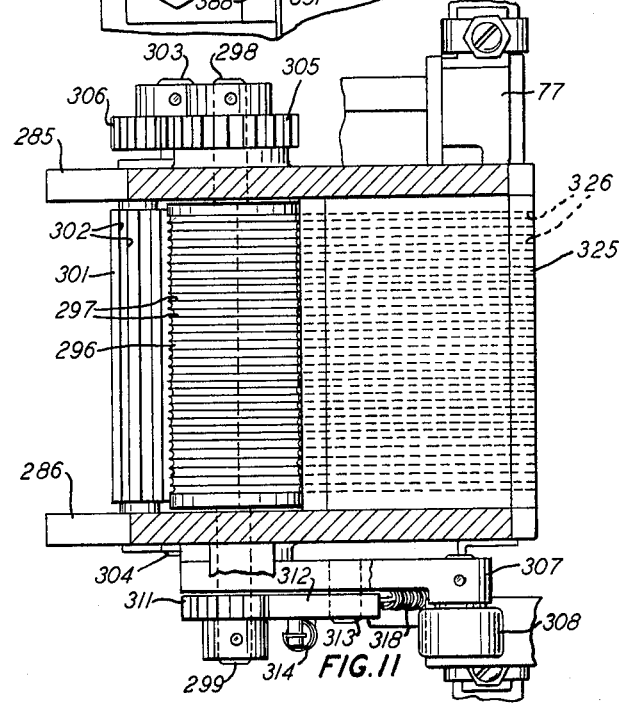
FIG. 11 is a sectional view taken on line 11—11 of FIG. 10 showing a solder advancing mechanism for advancing the solder to a position wherein it may be deposited on the conductors.

As shown in FIGS. 8 and 13, an extension rod 274 is pivotally mounted to the yoke 160 through a yoke 270 and extends therefrom and is provided with a head 275 at the free end thereof. A block 276 is slidably and coaxially positioned about the rod 274 and is connected to a lever 277. A compression spring 280 is coaxially positioned about the rod 274 between the block 276 and the yoke 270. The lever 277 is formed on a hub 278 at the opposite end thereof wherein the hub is coaxially and fixedly mounted about a shaft 279. The shaft 279 is coaxially mounted within a pair of fixed bearings 281 and 282 which is mounted in the vertical supports 182 and 183, respectively. A pair of arms 283 and 284 extends from the hub 279 and provides a pivotal support for the solder feed mechanism 55. The arms 283 and 284 further support extension supports 285 and 286, respectively, as shown in FIGS. 9, 10 and 11.

As viewed in FIGS. 9 and 10, the soldering feed device 55 is provided with a groove guide roller 297 mounted on a pair of supports 288 wherein the supports 288 are mounted on and extend from the vertical supports 182 and 183. The guide roller 287 is provided with a plurality of grooves 289 formed circumferentially in the periphery of the roller for guiding the passage of a plurality of strips of solder 291 to the solder feed apparatus 55. Mounted for rotation between the extension supports 285 and 286 is a pair of guide rollers 292 and 293 having grooves 294 and 295, respectively, formed circumferentially in the roller periphery. A feed roller 296 is provided with a plurality of grooves 297 formed circumferentially about the periphery thereof and is further provided with shaft extensions 298 and 299 which are mounted in bearings in the extension supports 285 and 286, respectively. A second feed roller 301 is provided with a series of grooves 302 formed in the periphery of the feed roller 301 in a parallel relationship with respect to the axis of the feed roller 301 thereby forming a fluted feed roller. The fluted feed roller 301 is further provided with shaft extensions 303 and 304 which are mounted in bearings in the extension supports 285 and 286, respectively. A pair of gears 305 and 306 is positioned in a meshing arrangement and is coaxially and fixedly mounted about the shaft extensions 298 and 303, respectively. Coaxially positioned about the shaft extension 299 is an arm 307 which is freely rotatable about the shaft extension 299 and hence not fastened thereto. Positioned at the free end of the arm 307 is a cam follower 308 which engages a fixed cam surface 309 during pivotal movement of the extension supports 285 and 286. A ratchet wheel 311 is coaxially and fixedly positioned about the shaft end 299 thereby enclosing the arm 307 between the ratchet wheel 311 and the extension support 286. A pawl 312 is pivotally mounted about a pin 313 which is mounted in the arm 307 intermediate the ends thereof. The free end of the pawl 312 is positioned to engage the ratchet wheel 311 and is biased into engagement with the ratchet wheel 311 by a tension spring 314. A second pawl 315 is pivotally mounted about a pin 316 which is mounted in the extension support 286 and held in a biasing engagement with the ratchet wheel 311 by a tension spring 317. The arm 307 is biased by a tension spring 318.

A supply rack, generally designated by the reference numeral 319 and shown in FIGS. 1 and 2, is provided with a supply of binding material such as a plurality of reels of solder 321 mounted for rotation in a frame support 322. The strips of solder 291 are fed from the respective reels 221 through a plurality of apertures formed in guide plates 323, which are mounted on the frame supports 322. The strips of solder 291 are further fed over a plurality of circumferentially grooved rollers 324, also mounted on the frame support 322 for rotation. The solder strips 291 are then passed over the guide roller 287, as previously described, and into the feed mechanism 55. Initially, the feed mechanism 55 assumes a position at rest as indicated in FIG. 9 where, upon actuation of the air cylinder 159, the lever arms 283 and 284 are pivoted to move the extension supports 285 and 286, respectively, downward to a position, as shown in FIG. 10. As the extension supports 285 and 286 are pivoted downwardly, the cam follower 308 engages the cam surface 309 to pivot the arm 307 about the shaft extension 299. As the arm 307 is pivoted, the pawl 312 is pivoted about the pin 313 and causes rotation of the ratchet wheel 311 in such a manner that the grooved feed roller 296 is rotated thereby driving the gear 305 and the gear 306 to rotate the fluted feed roller 301. As the feed rollers 296 and 301 are rotated, the plurality of strips of solder 291, which have been fed therebetween, are advanced through and extend in a cantilevered fashion from a plurality of grooves 326 formed in a guide channel 325 mounted between the extension supports 285 and 286. As viewed in FIG. 13, continued operation of the air cylinder 159 urges the lever 277 against a stop 327 mounted in a crossbar 328 which is supported by the vertical supports 182 and 183. Further operation of the air cylinder 159 urges the piston upwardly against the biasing of the spring 280 until the lever 162 engages a stop 329 which is mounted in a crossbar 331 also supported by the vertical supports 182 and 183. As the lever 162 is pivoted by the action of the piston rod 161, the soldering bar 173 engages the advanced strips of solder 291, melts and removes the cantilevered portions of the strips of solder 291 extending from the solder feed mechanism 55 and deposits the molten solder onto the exposed areas of the cantilevered portions of the conductors 41. Simultaneously, the cam 242 engages the cam followers 235 to pivot the followers about the pins 236 thereby releasing the comb 228 so that the comb moves downwardly within the slots 232 thus removing the teeth 229 of the comb 228 from about the conductor 41. It is to be noted that, as the ratchet wheel 311 is being rotated by the action of the pawl 312, the pawl 315 slips over the serrations of the ratchet wheel 311 thereby remaining in a substantially fixed position.

Figure 30:
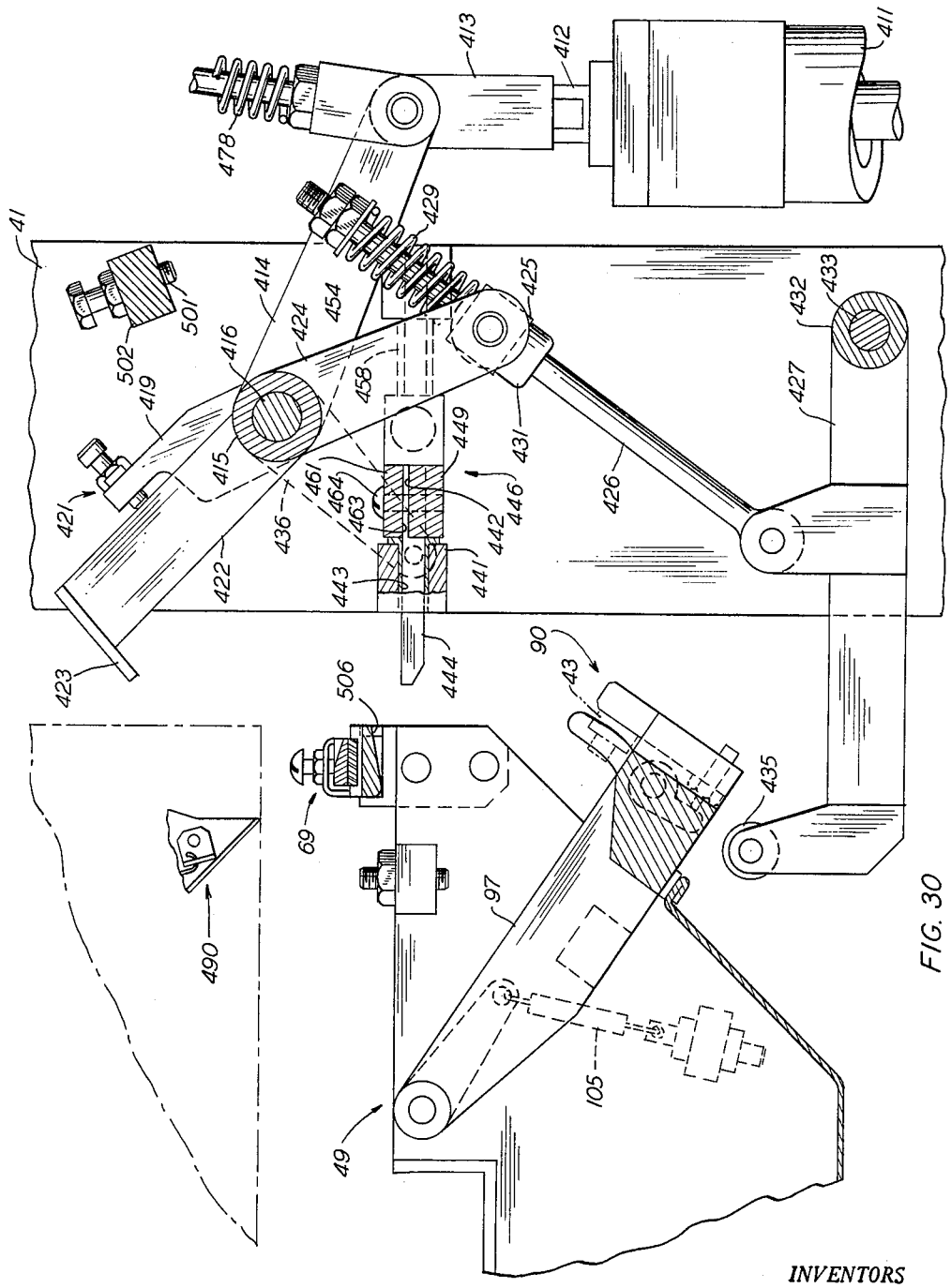
FIGS. 30 and 31 are sectional views taken on line 30—30 of FIG. 2 showing the sequential operation of a conductor and terminal assembling and securing device at a fourth work station.
Figure 31:
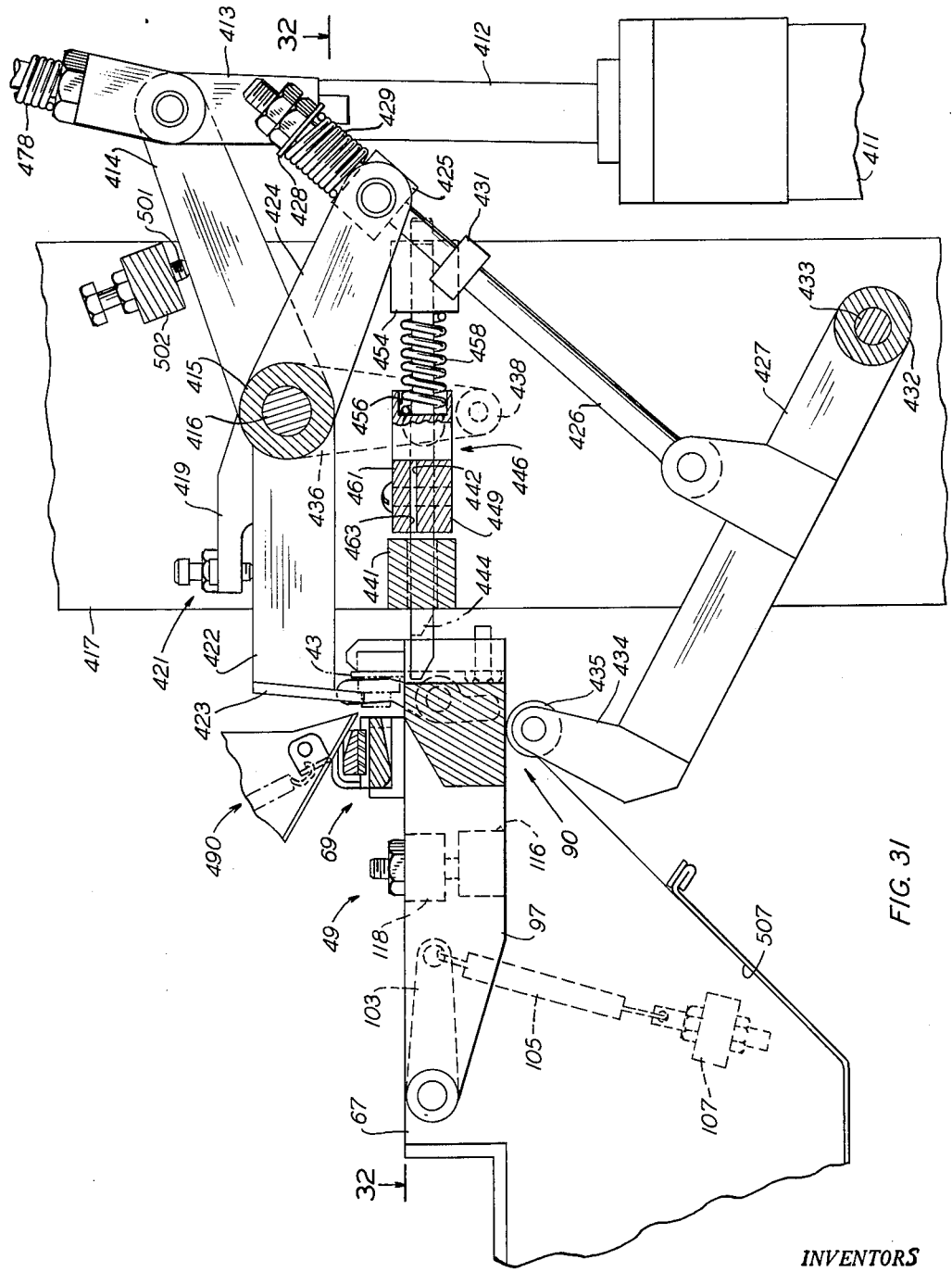

As the piston rod 161, and hence the rod 274, reaches the uppermost limit of its travel, a switch (not shown) is actuated by a magnet (not shown) which is mounted on the piston rod 161. The switch operates the solenoid valve 230 (FIG. 30) to deactuate the air cylinder 159 whereupon a reverse sequence of operations is initiated. Simultaneously, a switch 333 (FIG. 30) is actuated to open a valve 334 thereby providing an air pressure for a blow pipe 335, as shown in FIGS. 9 and 10. The blow pipe 335 is provided with a plurality of apertures 336 and is positioned to direct a blast of cooling air on the tinned, exposed areas of the conductors 41. As the piston rod 161 reaches the lowermost point of travel, a second switch is actuated to place the table indexing circuit in an enabling condition, thus operating substantially in the same manner as the safety feature disclosed in the operation of the burning station. As the lever 277 is pivoted in a downward position, the extension supports 285 and 286 are pivoted upwardly, as shown in FIG. 9. Upon the upward movement of the extension support 286, the arm 307 is effectively pivoted downwardly about the shaft extension 299. As the arm 307 pivots downwardly relative to the shaft extension 299, the pawl 312 skips over the serrations of the ratchet wheel 311, whereupon the pawl 315 is held in a biasing engagement with a serration of the ratchet wheel 311 to prevent any movement of the ratchet wheel 311. Thus, in this manner, the feed rollers 296 and 301 are prevented from rotating thereby preventing the advancement of the strips of solder 291 through the feed mechanism 55 during the reverse cycle. Since the solder strips 291 are gripped between the feed rollers 296 and 301, and pawls 312 and 315 prevent rotation of the feed rollers 296 and 301, a portion of solder is withdrawn from the reels 321 as the return pivotal action takes place. These portions of the strips of solder 291 which are withdrawn from the reels 321, during the retraction of the feeding mechanism 55, are advanced by the feed mechanism 55 during the next forward sequence of operation.

Due to the spacing between the blocks 251 and 252, the lever 248, and, hence the rod 254, is not pivoted until the block 251 engages the lever 248. At this point the lever 248 is actuated to move the rod 254 from the left position, as shown in FIG. 22, to a substantially vertical position wherein a snap action occurs due to the resilient force of the spring 264 to position the lever 253 and the rod 254 in the position, as shown in FIG. 21. During the pivotal movement of the levers 248 and 253, the shaft 249 is turned to pivot the arms 269 and 271 away from the crossbar 223 whereby the resilient biasing action of the springs 226 urge the clamping members 216 and 222 away from the clamp supports 205 and 211. In addition, the clam supports 205 and 211 are pivoted apart so that the clamping members 216 and 222 are separated. As the snap action of the rod 254 and the lever 253 occurs, clamping members 216 and 222 are quickly urged to the resting position, as shown in FIG. 8, wherein the cam 242 disengages from contact with the cam followers 235 to pivot the cam followers 235 in a position, as shown in FIG. 16, by the resilient action of the spring 237. Hence, the comb 228 is again positioned about the clamping member 216 wherein the clamping member and the comb 228 rest upon the rest support 243. Further, as the shaft 164 is rotated, the arms 168 and 169 are pivoted upwardly to withdraw the soldering bar 173 from engagement with the exposed and cantilevered portions of the conductors 41 thereby completing the stripping and tinning operation. As the piston rod 161 reaches the lowermost position within the air cylinder 159, a magnet (not shown) actuates a switch (not shown) in the table indexing circuit to enable the circuit to be actuated by the operator after the operator has positioned another plurality of conductors 41 and another connector 43 in a third holding fixture 49.

THIRD WORK STATION

*Cutting operation*

Figure 27:
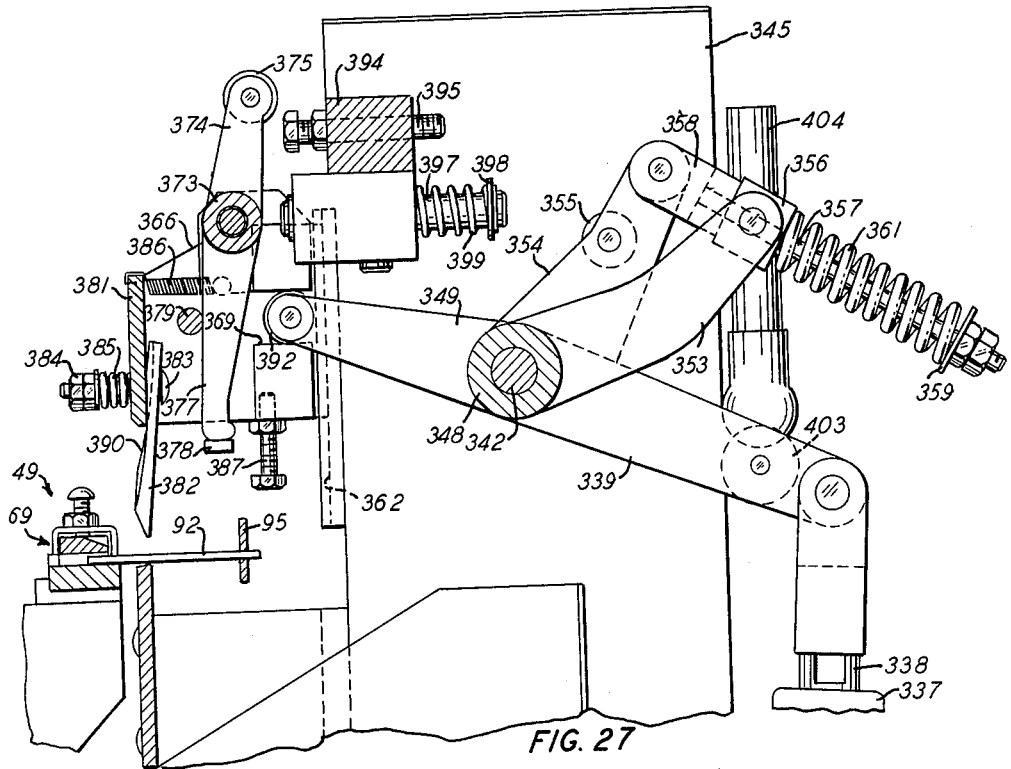
FIGS. 27, 28 and 29 are sectional views taken along line 27—27 of FIG. 25 showing the sequential operation of the cutting mechanism.

Upon completion of the stripping and tinning operation, the operator actuates the table indexing mechanism to turn the table 48 thereby positioning the first holding fixture 49 adjacent to the third work station 56. As viewed in FIGS. 25 through 29, inclusive, an air cylinder 337 is operated by the actuation of a solenoid valve 340 to move a piston rod 338 from within the air cylinder 337 thereby pivoting a lever 339. The lever 339 is formed about a hub 341 which is coaxially mounted on a shaft 342 and fastened thereto by a set screw 343. The shaft is further positioned within a pair of bearings 344 which is mounted in a pair of vertical supports 345 and 346. Mounted coaxially on the shaft 342 and between the hub 341 and each of the bearings 344 is a pair of hubs 347 and 348. The hubs 347 and 348 are provided with a pair of arms 349 and 351, respectively, extending in one direction and a second pair of arms 352 and 353, respectively, extending in a substantially opposite direction. An arm 354 extends from the hub 341 and is provided with a roller 355 mounted intermediate the ends thereof. A block 356 is pivotally mounted between the free ends of the arms 352 and 353 and is provided with a circular opening for receiving a rod 357 therein. The rod 357 is provided with a yoke 358 at one end thereof and a disc 359 is fixedly positioned about the opposite extremity of the rod 357. The yoke 358 is pivotally connected to the free end of the lever 354 and a compression spring 361 is coaxially positioned about the rod 357 and held between the block 356 and the disc 359. A pair of tracks 362 and 363 is mounted on the vertical supports 345 and 346, respectively, and provides a guide for a pair of slides 364 and 365, respectively. Formed from the slides 364 and 365 is a pair of vertical supports 366 and 367, respectively, which is provided with a pair of pockets 368 and 369, respectively. A shaft 371 is coaxially mounted within a pair of hubs 372 which is fixedly mounted to the supports 366 and 367. A circular hub 373 is coaxially mounted on the shaft 371 and positioned between the stationary hubs 372, and is keyed to the shaft 371 to rotate therewith. An arm 374 extends centrally from the hub 373 and is provided with a roller 375 at the free end thereof. A pair of arms 376 and 377 extends from the hub 373 in an opposite direction and is provided with a bar 378 transversely positioned across the free ends thereof. A rod 379 is mounted between the supports 366 and 367 and traversely engages an intermediate portion of the arms 376 and 377 when the system is at rest. A support 381 is transversely mounted on the free ends of the supports 366 and 367, and has fastened to an intermediate portion thereof a guillotine blade 382. A pair of bolts 383 is provided for fastening the blade 382 to the support 381. Nuts 384 are positioned about the free ends of the bolts 383 and are provided for retaining a pair of compression springs 385 between the nuts 384 and the support 381, wherein the springs 385 cooperate with a concave portion 390 of the blade 382 to resiliently urge the blade in a resting position, as shown in FIG. 27. A tension spring 386 is connected between the support 381 and the arm 376 thereby urging the arms 376 and 377 against the rod 379 when the system is at rest. A pair of bolts 387 is fastened to the underside of the supports 366 and 367 and engages a pair of extension plates 388 and 389 upon movement of the slides 364 and 365 thereby providing a stop feature. A fixed blade 391 is transversely mounted on the free ends of the extension plates 388 and 389. The arms 349 and 351 are provided with a pair of rollers 392 and 393, respectively, which engages the pockets 368 and 369, respectively, of the supports 366 and 367 to slide the cutting mechanism within the tracks 362 upon the operation of the air cylinder 337.

A crossbar 394 is fixedly positioned between the vertical supports 345 and 346 and is provided with a fixed stop 395 for engaging the yoke 358 thereby limiting the travel of the lever arm 354. Depending from the crossbar 394 is a cylinder 396 which has a rod 397 slidably mounted therein. One end of the rod 397 is provided with a fixed disc 398 and provides an enclosure for a compression spring 399 between the disc 398 and the cylinder 396.

Figure 28:
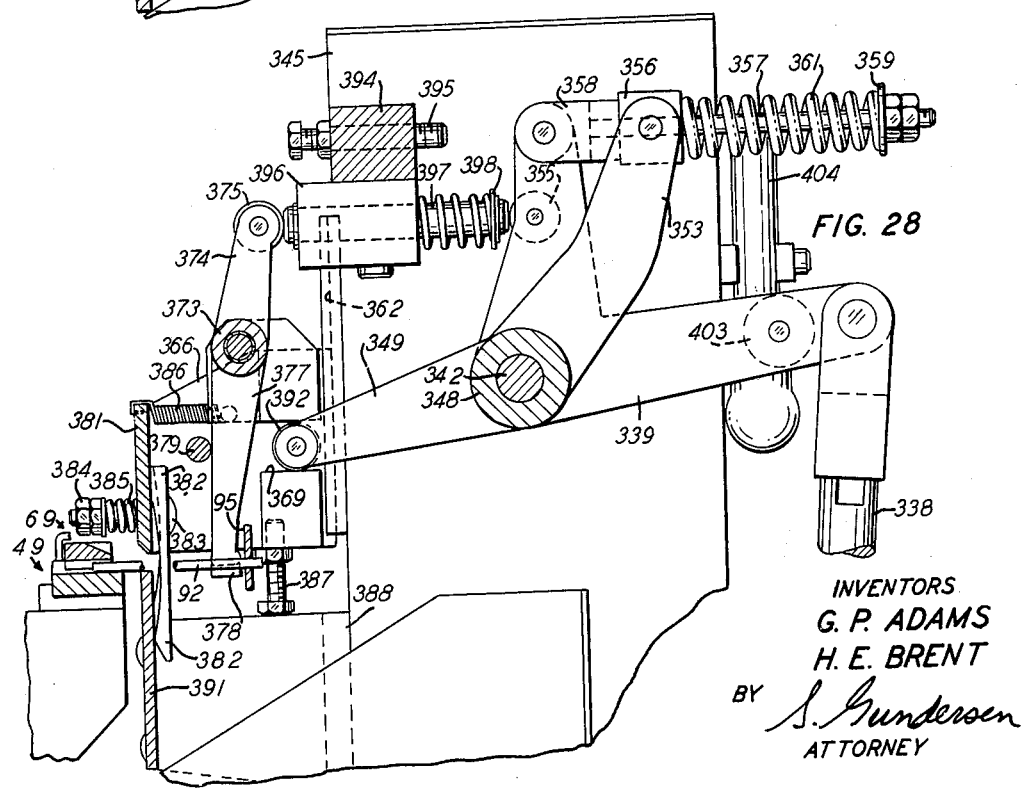
Figure 29:
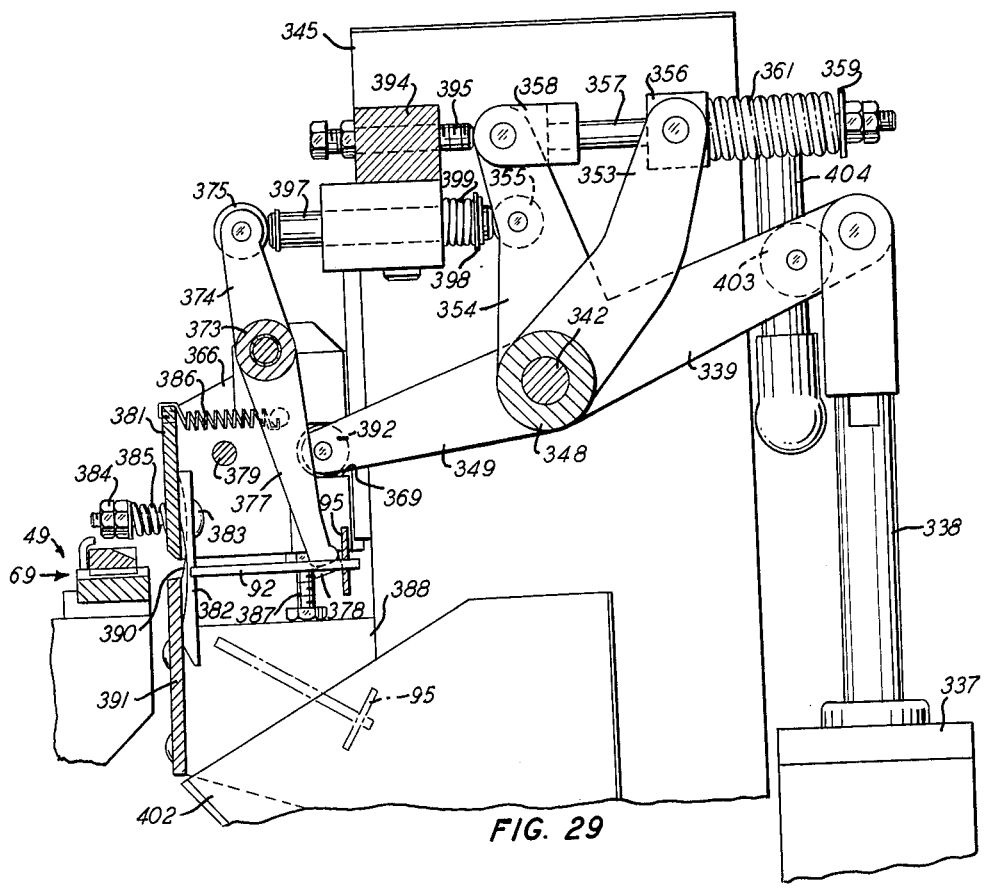

As shown in FIGS. 27, 28 and 29, the operation of the cutting mechanism is actuated by the operation of a solenoid valve 340 (FIG. 37) to operate the air cylinder 337. As the piston rod 338 is moved upwardly, the lever 339 is pivoted to rotate the hub 341 and, hence, the shaft 342. As the hub 341 is rotated, the lever arm 354 is pivoted to pivot the arms 352 and 353 through the mechanical cooperation of the yoke 358, the rod 357 and the block 356. As the arms 352 and 353 are pivoted, the hubs 347 and 348, respectively, are rotated freely about the shaft 342 thereby pivoting the arms 349 and 351, respectively, to urge the slides 364 and 365 to move downwardly within the tracks 362 thereby urging the blade 382 downwardly. As the blade 382 approaches the fixed blade 391, the tinned areas of the conductors 41 are engaged therebetween where, upon further movement of the blade 382, the conductors 41 are severed.

Upon continued pivoting of the arm 354, the roller 355 engages the rod 397 to slidably urge the rod 397 through the cylinder 396 so that the rod 397 engages the roller 375 which is mounted at the free end of the arm 374. As the rod 397 is forced against the roller 375, the hub 373 is rotated to pivot the arms 376 and 377 thereby moving the crossbar 378 into engagement with the remaining portions of insulation 44 and conductors 41 which are held between the teeth 96 of the comb 95 thereby partially urging the insulation and conductor remnants from between the teeth 96. As the stops 387 engage the extension plates 388 and 389, the hubs 347 and 348 are prevented from rotating where, upon continued movement of the lever 339, the block 356 remains in a fixed position whereby the rod 357 is urged therethrough to compress the spring 361, as shown in FIG. 29. The action of the spring 361 permits the continued operation of the removal of the comb 95 but restrains any further movement by the cutting mechanism. As the rod 397 is urged further through the cylinder 396, the arms 376 and 377 and the crossbar 378 engage the comb 95 to withdraw the comb from the holding fixture 49 whereupon the comb 95 and the severed portions of conductors 41 and the insulation 44 are deposited in a receptacle 402, as shown in phantom lines in FIG. 29. Upon completion of the operation, the yoke 358 engages the stop 355 thereby preventing further movement of the comb-removing mechanism. As viewed in FIG. 25, a magnet 403 is mounted on the lever 339 and actuates a switch 404 as the rod 338 reaches the uppermost point of travel wherein the switch 404 is mounted on a plate 405 extending from the vertical support 345. The switch 404 reverses the actuation of the solenoid valve 340 to deactuate the air cylinder 337 whereupon a reverse cycle of operation occurs in the cutting and comb-removing mechanisms. A second magnet 406 is mounted on the lever 339 and actuates a switch 407, which is mounted on a plate 408 extending from the vertical support 346 for conditioning the table indexing circuit for operation upon the actuation of a switch by the operator.

FOURTH WORK STATION

Soldering operation

As the cutting operation is completed and the operator has positioned another plurality of conductors 41 and a connector 43 in a fourth holding fixture 49, the driving mechanism is actuated to index the table 48 to the fourth work station 57 (FIG. 2) wherein a solenoid valve 409 (FIG. 37) is actuated to operate an air cylinder 411. Referring to FIGS. 30 through 35, inclusive, as the air cylinder 411 is operated, a piston rod 412 is projected therefrom and is provided with a yoke 413 connected to the free end thereof which is also pivotally connected to a lever 414. The lever 414 is formed on a hub 415 which is coaxially mounted on a shaft 416 for rotation therewith. The shaft is coaxially positioned within a pair of bearings (not shown) mounted in a pair of vertical supports 417 and 418. An arm 419 extends from the hub 415 and is provided with a fastening and adjusting feature, generally designated by the reference numeral 421, for connecting the arm 419 to a soldering bar support arm 422 which is mounted for free rotation about the shaft 416. A soldering bar 423 is mounted at the free end of the support arm 422 which also supports a heater (not shown) for heating the soldering bar. It is to be noted that the soldering bar 423 and the supporting elements therefor are substantially identical to the soldering device as disclosed in a discussion of the second work station 54. An arm 424 extends from the hub 415 and is connected at the free end thereof to a block 425. The block 425 is slidably positioned on a rod 426 which is pivotally mounted at one end thereof to a lever 427. The opposite extremity of the rod 426 is provided with a disc 428 for retaining a compression spring 429 between the block 425 and the disc 428. Further, a fixed engaging block 431 is mounted on the rod intermediate the ends of the rod 426. The lever 427 is formed about a hub 432 at one end thereof wherein the hub 432 is coaxially mounted about a shaft 433 for rotation thereabout. The opposite extremity of the lever 427 is provided with a perpendicular extension 434 which is further provided with a roller 435.

A pair of arms 436 and 437 (FIG. 34) is connected to the extremities of the shaft 416 and is provided at the opposite extremity thereof with a pair of rollers 438 and 439, respectively. A guide plate 441 is mounted between the supports 417 and 418 and is provided with a pair of apertures 442 and 443 for receiving therein a pair of component supporting rods 444 and 445, respectively. A U-shaped member 446 has a pair of semicircular grooves 447 and 448 formed therein, each of which extends into cylindrical portions 449 and 451, respectively, wherein apertures 452 and 453 coincide with the semicircular grooves 447 and 448, respectively, to receive the supporting rods 444 and 445, respectively, therein. The rods 444 and 445 extend from the U-shaped member 446 and are slidably positioned within the apertures in a pair of blocks 454 and 455, respectively, which is mounted on the vertical supports 417 and 418, respectively. The cylindrical portions 449 and 451 are provided with a pair of counterbores 456 and 457, respectively, for receiving a pair of compression springs 458 and 459, which is coaxially positioned about the support rods 444 and 445 and is further held between the counterbore 456 and the block 454 and the counterbore 457 and the block 455, respectively. A top plate 461 is provided with a pair of arcuately shaped grooves 462 and 463, which is positioned over the portions of the support rods 444 and 445, respectively, which rest in the semicircular grooves 447 and 448. A pair of screws 464 is provided for fastening the top plate 461 to the U-shaped member 446. Mounted on and extending in a perpendicular fashion from the cylindrical portions 449 and 451 of the U-shaped member 446 is a pair of hubs 465 and 466, respectively. The hubs 465 and 466 are provided with threaded apertures 467 and are formed in the free end thereof with a semi-cylindrical portion 468 (FIG. 35).

A pair of lever-shaped cams 469 and 471 is fastened to the hubs 465 and 466, respectively, by means of threaded members 472. The threaded members 472 are provided with a shank portion 473 for allowing the cams 469 and 471 to rotate thereabout. A pair of hubs 474 and 475 extends from each of the cams 469 and 471, respectively, and is formed at the free ends thereof with a quarter-cylindrical portion 476 (FIG. 29) which mates substantially with the semicircular portion 468 of the hubs 465 and 466. It is to be noted that the pair of hubs 474 and 475 extends through a pair of slots 470 and 480, respectively, in the vertical supports 417 and 418, respectively. A pair of torsion springs 477 is positioned about each of the pairs of hubs 465, 474 and 466, 475 wherein one end of the spring 477 is fastened to the U-shaped member 446 and the opposite end is connected to either of the cams 469 and 471. An extension rod 478 is pivotally connected to the yoke 413 at one end thereof and is fastened at the opposite extremity thereof to a solder feed mechanism 490 identical to that disclosed in the discussion of the stripping and tinning operation provided at the second work station 54.

Figure 34:
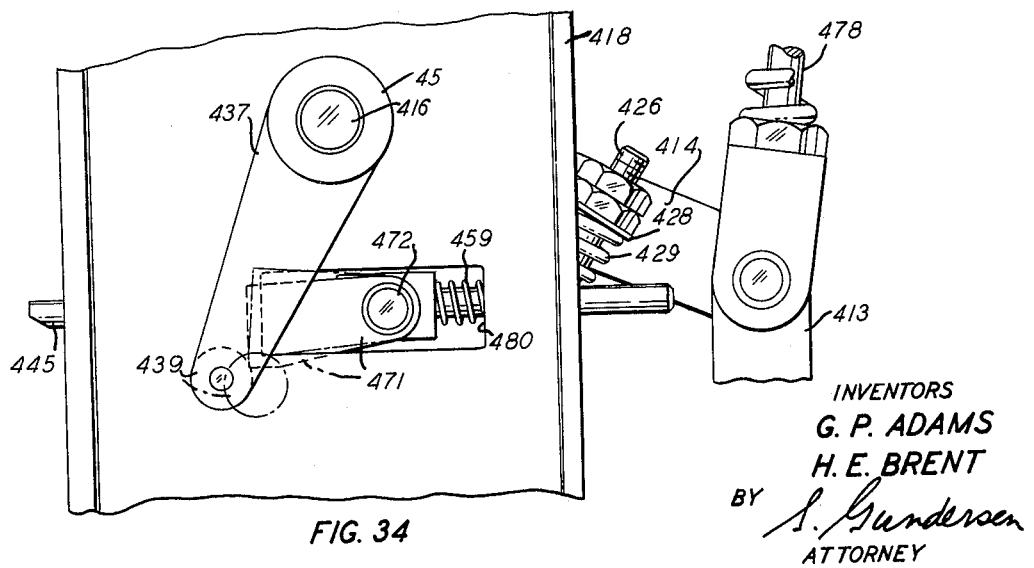
FIG. 34 is a sectional view taken on line 34—34 of FIG. 33 showing a cam controlling feature for the retraction of the connector retarding device.

Referring again to FIGS. 30 through 35, inclusive, as the air cylinder 411 is operated, the piston rod 412 pivots the lever 414 and actuates the solder feed mechanism through the movement of the rod 478. Pivotal movement of the rod 414 pivots the solder bar 423, as previously described, and also pivots the arms 436 and 437. In addition, the arm 424 is pivoted to exert a force upon the block 425 against the biasing action of the spring 429 to pivot the lever 427. Upon pivotal movement of the lever 427, the roller 435 engages the lift support plate 100 where, upon continued pivotal movement of the lever 427, the component holding arms 97 and 98 are pivoted upwardly against the biasing action of the springs 105 and 106, respectively. Thus, it is easily seen that the connector 43 is positioned so that the tinned, precut, solidified ends of the conductors 41 are assembled in the corresponding plurality of U-shaped terminals 42. As the connector 43 is being positioned, the rollers 438 and 439 engage the cams 469 and 471, as shown in FIG. 34, tending to create a downward pivotal movement in the cams 469 and 471. However, the quarter-cylindrical portion 476 of the hubs 474 and 475 engages a shoulder 499 (FIG. 35) of the semicylindrical portion 468 on the hubs 465 and 466, respectively, thereby preventing pivotal movement of the cams 469 and 471. Thus, a lateral movement of the cams 469 and 471 through the slots 470 and 480, respectively, is provided as the rollers 438 and 439 are pivoted downwardly thereby moving the U-shaped member 446 against the biasing action of the springs 458 and 459 in such a manner that the support rods 444 and 445 are moved rearwardly. Hence, the free ends of the rods 444 and 445 withdraw from the pivotal path of the connector nest 90 during the assembling of the plurality of conductors 41 to the corresponding plurality of U-shaped terminals 42 of the connector 43. Continued pivotal movement of the arms 436 and 437 urges the rollers 438 and 439 away from the cams 469 and 471, respectively, whereupon the biasing action of the compression springs 458 and 459 urges the U-shaped member 446, and hence the support rods 444 and 445, respectively, in a forward position so that the free ends of the rods 444 and 445 extend subjacent to the connector 43. The heated soldering bar 423 is pivoted to engage the advanced cantilevered strips of solder 291, as previously discussed, and deposits molten portions of the solder onto each of the assembled plurality of conductors 41 and the corresponding terminals 42 of the connector 43 where the soldering bar 73 is allowed to dwell so that the molten solder will flow about each of the assembled conductors 41 and terminals 42 to provide a corresponding plurality of connections. Simultaneously, the lever 414 engages a stop 501 which is mounted in a crossbar 502 wherein the crossbar 502 is mounted between the vertical supports 417 and 418. A solenoid valve 503 is actuated thereby providing air pressure for a cylinder 504 which is provided with a plurality of apertures 505. The apertures 505 are positioned adjacent to the assembled conductors and terminals and provide a blast of cooling air to solidify the soldered connections. As the piston rod 412 approaches the uppermost point of travel, a magnet (not shown) actuates a switch (not shown) to reverse the cycle of operation wherein the solder feed mechanism 55 and a solder bar 73 are retracted. Further, the lever 427 is pivoted downwardly whereupon the springs 105 and 106 urge the arms 97 and 98 downwardly. As the arms 97 and 98 are urged downwardly, the support rods 444 and 445 engage the underside of the connector 43, thereby preventing the connector 43 from moving with the connector holding nest 90 which is mounted between the arms 97 and 98. The pivotal clamps 112 and 113 are urged against the action of the spring-loaded plungers 114 and 115, respectively, to free the connector 43.

As the lever 414 is pivoted downwardly, the arms 436 and 437 are pivoted in a clockwise direction, as viewed in FIG. 34, thereby engaging the cams 469 and 471, respectively, to pivot the cams 469 and 471 against the action of the springs 477 where the quarter-cylindrical portion 476 is rotated to allow the arms 436 and 437 to pivot. As the arms 436 and 437 clear the cams 469 and 471, respectively, the cams 469 and 471 return to a normal resting position due to the torsion biasing of the springs 477 where the quarter-cylindrical portion 476 rests on the shoulder 479 of the semicylindrical portion 478, as viewed in FIG. 35.

As the piston rod 412 approaches the lowermost point of travel, a magnet (not shown) actuates a switch (not shown) which conditions the indexing circuit for the turntable 48. Upon completion of the positioning of another plurality of conductors 41 and another connector 43 into a fifth holding fixture 49, the operator actuates the indexing circuit to index the turntable 48 to slide the connector 43 away from the support rods 444 and 445 whereby the soldered connections retain the connector 43 with the holding fixture 49. As the holding fixture 49 is positioned adjacent to the loading station 50, the operator removes the completed product 59 and positions another plurality of conductors 41 and another connector 43 in the holding fixture 49.

It is to be noted that the bottom plate 73 of the holding fixture 49 (FIG. 3) is provided with a bevelled surface 560 on the underside thereof. Additionally, a receptacle 507 is positioned between the vertical supports 67 and 68 and is provided with a lip 508 for limiting the downward movement of the connector holder arms 97 and 98. As previously mentioned, the connector 43 is provided with a second plurality of terminals 46. In the event it is desired to assemble and secure a second plurality of conductors 41 to the terminals 46 of the connector 43, the connector 43 is positioned in the connector holding nest 90 between the back plates 109 and 111 and the pivotal clamps 112 so that the terminals 42 and the conductors 41 secured thereto are on the lowermost portion of the connector holding assembly. The cable 45 is deposited in the receptacle 507 thereby providing a means for retaining the cable 46 in a position away from the various operations as the second plurality of conductors 41 are secured to the terminals 46. As the turntable positions the holding fixture 49 adjacent to the fourth work station 57, after the preceding operations have been performed, the connector holding assembly is positioned as previously discussed so that the plurality of the solidified ends of the conductors 41 are assembled with the corresponding plurality of terminals 46 of the connector 43. It is to be noted that the bevelled surface 506 of the bottom plate 73 permits the conductors 41, which were previously secured to the terminals 42, to assume a position with respect to the connector 43 without any undue strain thereupon.

GENERAL OPERATION

Referring to FIGS. 1, 2, 3, 4 and 32, the operator initially fans and positions the plurality of stranded cable conductors 41 into the grooves 75 of the bottom plate 73 at the loading station 50. The comb 95 is positioned within the semicircular grooves 91 and 92 and is positioned to receive the cantilevered portions of the conductors 41 between the teeth 96 thereof. The clamp 77 is positioned atop the conductors 41 so that the neoprene strip 78 resiliently engages the conductors 41. The toggle clamps 79 and 81 are then positioned and clamped to lock the top clamp 77 in position thereby clamping the conductors 41 between the bottom plate 73 and the top clamp 77. The connector 43 is then inserted into the connector nest 90 between the back plates 109 and 111 and the pivotal clamps 112 and 113, respectively, and are resiliently held therebetween by the biasing action of the spring-loaded plungers 114 and 115, respectively. Upon completion of the loading operation, the operator actuates the motor 62 to drive the Geneva mechanism 51 thereby indexing the turntable 48 and the holding fixture 49 to a position adjacent to the first work station 52.

Figure 5:
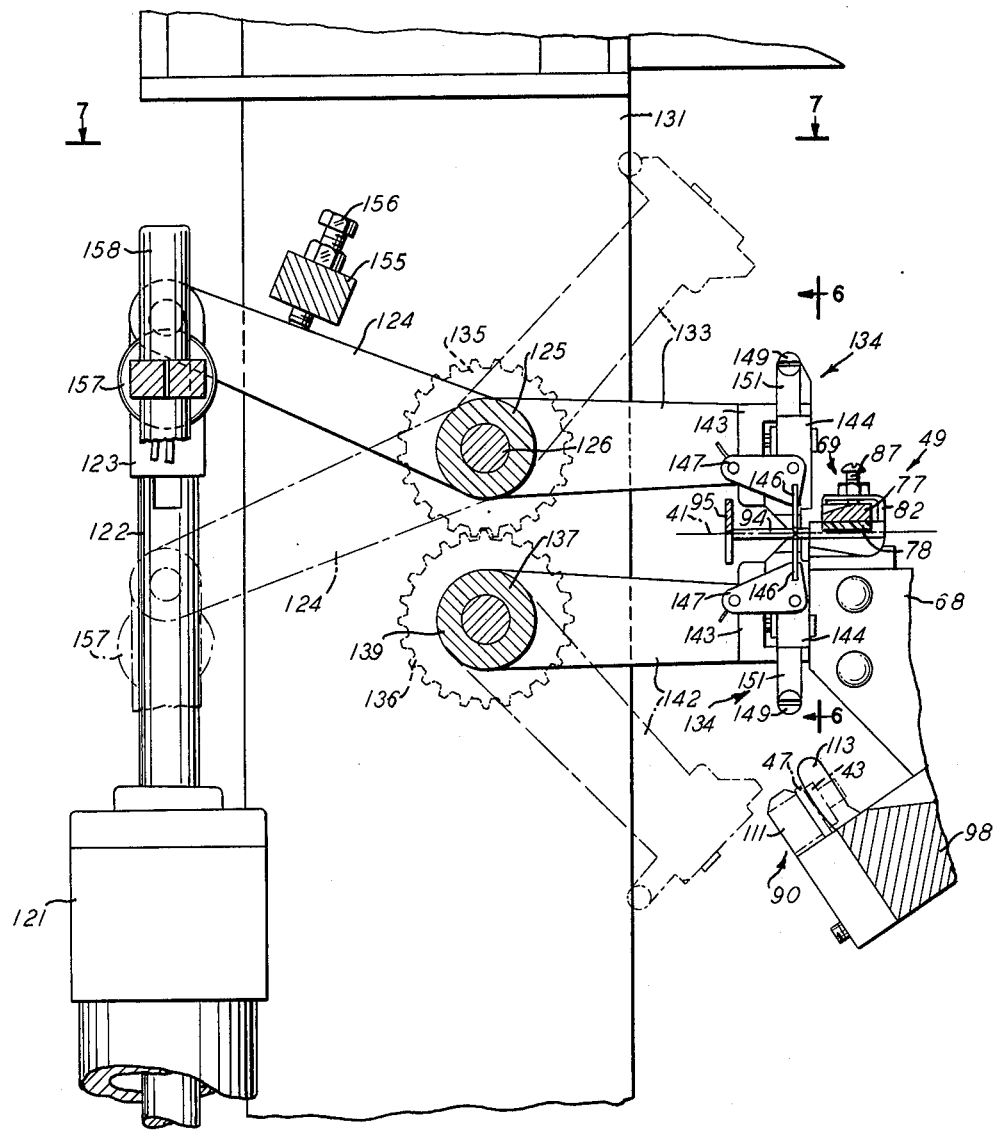
FIG. 5 is a sectional view taken on line 5—5 of FIG. 2 showing a burning device for burning insulation from the conductors positioned at a first work station.

Referring to FIGS. 5, 6 and 7, as the holding fixture 49 is positioned adjacent to the first work station 52, the solenoid valve 120 is actuated to operate the air cylinder 121, whereupon the opposing portion of the nichrome wire burning device 134 are pivoted towards the cantilevered portions of the conductors 41 held between the conductor holder 69 and the comb 95. Simultaneously, a circuit is actuated to provide a heating current, through the transformers 153, for the nichrome wires 146 of the burning devices 134. As the nichrome wires 146 engage the insulation 44 of each conductor 41 therebetween, the insulation is burned from the conductors 41 thereby providing a portion of free insulation remaining between the burned area and the free ends of the conductors 41. Upon completion of the burning operation, the burning devices 134 are retracted by the deactivation of the air cylinder 121 whereupon the operator indexes the turntable 48 to position the holding fixture 49 adjacent to the second work station 54.

As shown in FIGS. 8 through 22, inclusive, the holding fixture 49 is positioned adjacent to the second work station 54, the air cylinder 159 is operated to initiate a sequence of operations dependent upon 45° pivotal movement of the lever 162 wherein during the first 15° of rotation of the lever 162, the shaft 164 is rotated to pivot the soldering bar 173 through 15°. Additionally, the lever 185 is pivoted to urge the rod 186 upwardly thereby pivoting the lever 187 and turning the shaft 192. As the shaft 192 is turned, the pair of gears 195 and 196 is rotated to drive the pairs of gears 197, 198 and 206, 207 thereby pivoting the clamping members 216 and 222 through 15°. The rod 274 which is connected to the yoke 270 is urged upwardly to pivot the lever 277 which actuates and pivots the solder feed mechanism 55 from a position as shown in FIG. 9 to a position as shown in FIG. 10, thereby positioning the plurality of cantilevered strips of solder 291 superjacent to the cantilevered portions of the conductors 41. Upon 15° of pivotal movement, the lever 277 engages the stop 327 thereby preventing further movement. Further, as the lever 162 is pivoted through 15°, the lever 245 is pivoted through 15° to urge the rod 246 and hence the block 252 slidably through the block 247 to position the block 252 adjacent to the block 247. Thus, it is to be noted that the lever 248, and hence the shaft 249 and the pusher arms 269 and 271, is not moved during the first 15° of pivotal movement of the lever 162.

As the lever 162 continues through pivotal movement from 15° to 30°, the soldering bar 173 is pivoted through another 15° as the lever 162 is rotated to 30°. Further, the lever 185 is pivoted through a second 15° to continue the movement of the lever 187 thereby pivoting the clamping members 216 and 222 about the free insulation 44 remaining on the conductors 41 between the burned areas and the free ends of the conductors 41 and positioning the teeth 229 of comb 228 about the exposed areas of the conductors 41. The clamping members 216 and 222 are lined with the neoprene rubber 227 to provide a resilient gripping action of the free insulation 44. It is to be noted that due to the clamping of the members 216 and 222 about the conductors 41, the lever 197 is prevented from further rotation. Additionally, as the lever 162 is pivoted from 15° to 30°, the lever 245 urges the block 252 against the block 247 to pivot the lever 248. As the lever 248 is pivoted, the pusher arms 269 and 271 are pivoted so that the rollers 272 and 273, respectively, engage the cross bar 223 which is transversely mounted between the rods 212 and 213. Additionally, the rod 254 is pivoted from the position shown in FIG. 21 to the vertical position shown in FIG. 22 wherein the spring 264 is slightly compressed.

Continued operation of the air cylinder 159 urges the lever 162 through continuous pivotal movement from 30° to 45° where the lever 162 engages the stop 329 thereby preventing further movement of the lever 162. During the last 15° cycle, block 252 is further urged against the block 247 to continue the pivotal movement of the lever 248 whereupon the arms 269 and 271 are pivoted through 15° to urge the crossbar 223 in a rearward direction as shown in FIG. 13. Due to the compression of spring 264, a snap action occurs wherein rod 254 assumes a position to the left, as shown in FIG. 22, thereby providing a locking action of the arms 269 and 271 on the crossbar 223. Further, the pivotal movement of lever 162 urges continual pivotal movement of the lever 185 whereupon the rod 184 is slidably moved through the block 188 due to the clamping action of clamping members 216 and 222 preventing further movement of lever 197. As the rod 186 is slidably urged through the block 188, the disc 190 compresses the compression spring 189 thereby providing positive biasing action on the clamping members 216 and 222. As the crossbar 223 is urged in a rearward direction, the clamping members 216 and 222 and the comb 228 are urged towards the clamp supports 205 and 211, respectively. The comb provides a stripping action wherein the free insulation 44 remaining on the cantilevered portions of the conductors 41 are partially withdrawn thereby exposing a larger area of the conductors 41 and simultaneously retaining the individual stranded conductors in a grouped orientation. As the comb 228 is withdrawn to strip the free insulation from the conductor 41, the cam followers 235 engage the cam 242 whereupon the cam followers 235 are rotated about the shafts 236 and against the biasing action of the tension spring 237 to allow the comb 228 to move vertically within the slots 232 as viewed in FIG. 19. Thus, the comb 228 and the teeth 229 are removed from the exposed areas of the conductors 41 as the partial stripping operation is completed. It is to be noted that the clamping members 216 and 222 provide an additional feature wherein the free insulation 44 is prevented from piling up as the comb strips the insulation 44 from the conductors 41. Further attention is directed to the purpose of the partial stripping of the insulation from the cantilevered portions of the conductors 41 wherein the free insulation retains the stranded conductors 41 in a substantially grouped arrangement thereby preventing a fanning or spreading of the individual strands during the tinning operation. During the final 15° of pivotal movement of the lever 162, the soldering bar 173 is also pivoted through a final 15° of movement. As this final pivotal movement occurs, the soldering bar 173 engages the cantilevered portions of the strips of solder 291 and melts these portions of each strip so that the solder adheres to the soldering bar in a molten state. The soldering bar 173 continues the pivotal movement to deposit the molten portions of solder onto the exposed areas of the conductors 41 where the molten solder flows about the strands of the individual conductors thereby substantially solidifying the exposed areas. Upon completion of the soldering operation, air is supplied to the cylinder 335 to provide an air blast through the apertures 336 thereby cooling and solidifying the solder which was deposited onto the exposed areas of the conductors 41.

Upon completion of the stripping and tinning operation, the solenoid valve 230 (FIG. 37) is actuated in a reverse direction to deactivate the air cylinder 159 where the lever 162 is pivoted in a reverse direction. Upon pivotal movement of the lever 162 in a reverse direction, the soldering bar 173 is pivoted away from the tinned areas of the conductor 41. Additionally, during the first 15° return pivotal movement of the lever 162, the lever 248 slidably urges the rod 246 through the block 247. It is to be noted that the block 251 is positioned on the rod 246 so that it will not engage the block 247 until the lever 162 has completed a 15° pivotal movement of the return cycle. Hence, the crossbar 223 is retained in a rearward position by the rollers 272 and 273. Due to the retention of the crossbar 223 in the rearward position, the clamping members 216 and 222 are retained in the retracted position during the first 15° pivotal movement of the lever 162 of the return cycle. As the lever 185 is pivoted by the action of the pivotal movement of the lever 162 on the return cycle, the rod 186 slides through the block 188 thereby relieving the compression of the spring 189. It is to be noted that the block 191 is spaced from the block 188 during the initial movement of the lever 185 and the rod 186 before the block 191 engages the block 188. In addition, as the air cylinder 159 is deactivated, movement of the piston rod 161 urges the rod 274 slidably through the block 276 thereby substantially relieving the compression of the spring 280. However, as the rod 274 is slidably moved through the block 276, the head 275 of the rod 274 does not travel a sufficient distance to engage the block 276 to pivot the lever 277 away from the stop 327. Hence, the lever 277 remains in engagement with the stop 327.

During the second 15° pivotal movement of the lever 162 on the return cycle, the soldering bar 173 is further pivoted away from the exposed areas of the conductors 41. Further, the block 251 engages the block 247 to pivot the lever 248 thereby pivoting the rod 254 from the left position to the vertical position, as viewed in FIG. 22, thus pivoting the arms 269 and 271. As the arms 269 and 271 are pivoted on a reverse cycle, the rollers 272 and 273, respectively, are pivoted away from the crossbar 223 thereby allowing the crossbar and the clamping members 216 and 222 to move in a forward direction due to the resilient action of the compression springs 226. In addition, the block 191 engages the block 188 to pivot the lever 187 where, upon the movement of the gearing system as described, the clamp supports 205 and 211 are pivoted towards an open position. Thus, it is easily seen that during the second 15° of the return cycle, the clamping members 216 and 222 are not only urged apart but are simultaneously urged in the forward direction by the action of the compression springs 226. It is to be noted that the lever 277 and hence the solder feed mechanism 55 remain in the forward position.

Figure 18:
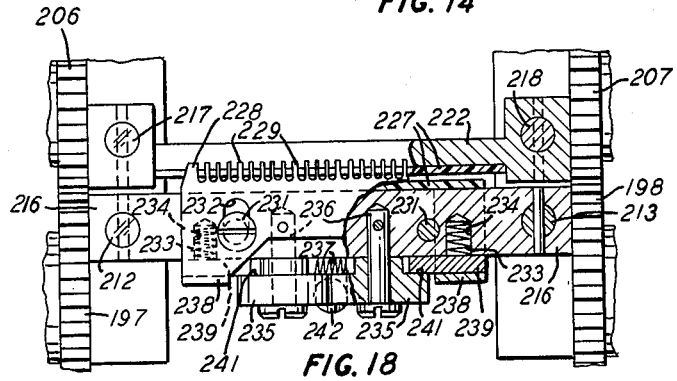
FIG. 18 is a sectional view taken on line 18—18 of FIG. 8 showing a partial front view of the insulation stripping comb and the cam controls therefor.
Figure 15:
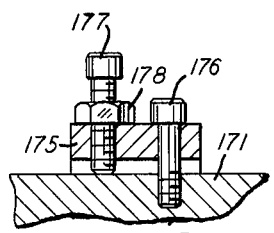
FIG. 15 is a sectional view taken on line 15—15 of FIG. 14 showing an adjusting and securing feature of the tinning device.
Figure 19:
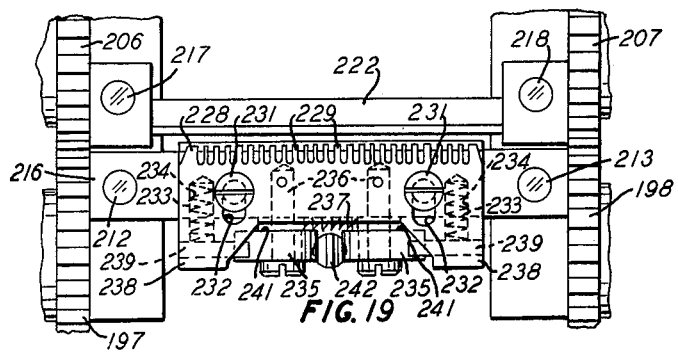
FIG. 19 is a sectional view taken on line 19—19 of FIG. 13 showing a front view of the engagement of the cam with the cam followers to remove the comb from an insulation stripping position.

During the final 15° of the reverse cycle, the soldering bar 73 is pivoted to a rest position as viewed in FIG. 8 and the head 275 engages the block 276 to pivot the lever 277. As this action occurs, the solder feed mechanism 55 is pivoted away from the soldering area, as shown in FIG. 9, and in such a manner that a portion of the strips of solder 291 are pulled from the supply spools 321. In this manner, the strips of solder 291 which will be advanced by the feed rolls 296 and 301 during the next forward cycle have been removed from the supply spools 321 thereby eliminating the necessity of the feed rolls 296 and 301 pulling the strips of solder 291 directly from the supply spools 321. In addition, the block 251 urges the block 247 downwardly thereby providing continual pivotal movement of the lever 248. As the lever 248 pivots the arm 253, the rod 254 is pivoted about the pins 258 and 259 where, upon slight pivotal movement to the right, as viewed in FIG. 22, the biasing action of the compression spring 264 creates a snap action substantially similar to that in the forward cycle of operation to pivot the rod 254 to the position at the right, as shown in FIG. 21, thereby urging a snap action in the pivoting of the arms 269 and 271 away from the crossbar 223. As the retaining force is removed from the crossbar 223 by the snap action of the arm 253, and the arms 269 and 271, the clamping members 216 and 222 are urged forwardly in a continuing fashion by the compression springs 226. It is to be noted that as the clamping member 216 is quickly urged in a forward position, the cam followers 235 disengage the cam 242 and cooperate with the rest 243 to position the comb 228 within the slots 232 so that the spacers 239 are positioned on the shoulders 241 of the cam followers 235 thereby retaining the comb 228 in close engagement with the clamping member 216 as shown in FIGS. 8 and 18. As the lever 185 is pivoted through the final 15°, the block 191 urges the block 188 downwardly, as viewed in FIG. 20, and hence pivots the lever 187 so that the clamp supports 216 and 222 are pivoted to an open position, as viewed in phantom lines of FIG. 8, and so that the clamping member 216 and the comb 228 are positioned atop the rest 243. As the air cylinder 159 is completely deactivated, a switch is actuated to condition the indexing circuit for operation by the operator.

As the table 48 is rotated to the third work station 56, the holding fixture 49 is positioned adjacent to the cutting mechanism whereupon an air cylinder 337 is operated to actuate the cutting mechanism. Referring to FIGS. 25 through 29, inclusive, as the air cylinder 337 is operated, the lever 339 is pivoted to slide the supports 366 and 367 within the tracks 362 and 363, respectively, thereby urging the resiliently mounted guillotine blade 382 towards the fixed blade 391. In addition, as the lever 339 is pivoted, the pusher arms 376 and 377 which are mounted between the supports 366 and 367, are urged downwardly towards the extended conductors 41, the free insulation 44, and the comb 95. The arms 352, 353 and 354 are pivoted towards the rod 397 and the stop 395. Continued pivotal movement of the lever 339 urges the guillotine blade 382 into contact with the tinned areas of the conductors 41 where the blade severs the conductors 41 in a traversing fashion and in an individual manner due to the tapered edge of the guillotine blade 382. As the guillotine blade 382 engages the fixed blade 391, the guillotine blade 382 is urged alongside the fixed blade 391 against the resilient action of the compression spring 385 so that the concave portion 390 of the guillotine blade 382 is positioned adjacent to the fixed blade 391.

Figure 25:
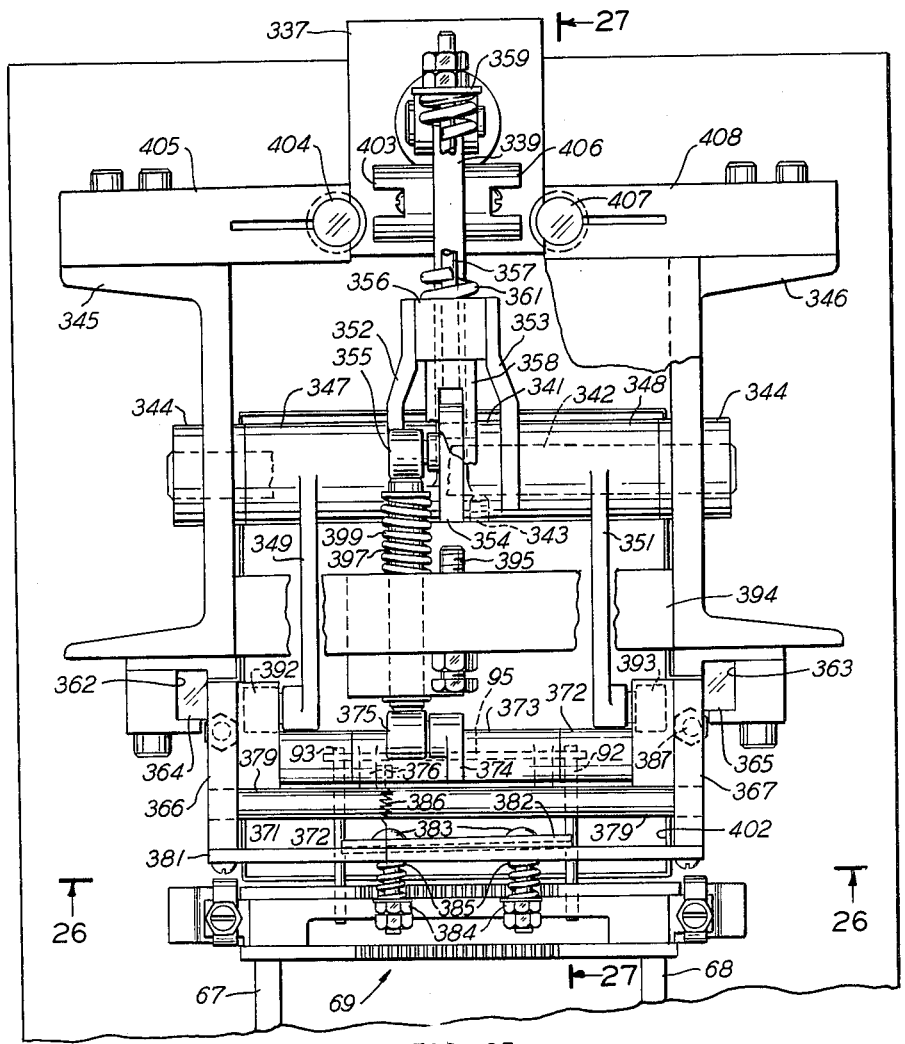
FIG. 25 is an enlarged plan view of a third work station, as viewed in FIG. 2, wherein a conductor cutting mechanism is shown.

As the cutting operation is completed, the stops 397 engage the extensions 388 and 389 to prevent further downward movement of the supports 366 and 367 within the tracks 362 and 363, respectively. It is to be noted that the arms 349 and 351, which provide the driving force for the supports 366 and 367, respectively, are mounted on the pair of hubs 347 and 348, respectively, as shown in FIG. 25. In addition, the pair of arms 352 and 353 also extends from the hubs 347 and 348, respectively. Since the arms 349 and 351 are prevented from further pivotal movement by the action of the hubs 397, the arms 352 and 353 are also prevented from further pivotal movement.

Continued pivotal movement of the lever 339 urges the arm 354 towards the stop 395 and the rod 397 thereby pulling the rod 357 slidably through the block 356 which is held between the arms 352 and 353 as shown in FIGS. 28 and 29. As the arm 354 is pivoted, the roller 355 engages the rod 397 and urges the rod slidably through the cylinder 396 so that the opposite extremity of the rod 397 engages the roller 375 which is mounted at the free end of the arm 374. As the rod 397 is urged against the roller 375, the arm 374 is pivoted to turn the hubs 373 to pivot the pusher arms 376 and 377. As the pusher arms 376 and 377 are pivoted, the crossbar 378, which is mounted transversely on the free ends thereof, engages the severed portions of the conductors 41 and the insulation 44 which remain between the teeth 96 of the comb 95 thereby urging the severed conductors 41 and the insulation 44 partially from between the teeth 96. Further pivotal movement of the arm 354 urges the rod 397 through the cylinder 396 and against the compressing force of the spring 399 to pivot the pusher arms 376 and 377 and the crossbar 378 into engagement with the comb 95 where, upon further pivotal movement of the arms 376 and 377, the comb is urged away from the holding fixture 49 so that the comb arms 93 and 94 are urged from the grooves 91 and 92, respectively. As shown in phantom lines in FIG. 29, the comb arms 93 and 94 are completely removed from the grooves 91 and 92, respectively, whereupon the comb and the severed conductors 41 and the insulation 44 fall freely into the receptacle 402. As this action occurs, it is to be noted that the compression springs 361 and 399 are fully compressed thereby limiting any further movement of the elements involved. In addition, the yoke 358 has engaged the stop 395 to prevent further pivotal movement of the arm 354. As the yoke 358 engages the stop 395, the magnet 403 actuates the switch 404 to operate the solenoid valve 340 (FIG. 37) thereby reversing the operation of the air cylinder 337. As the air cylinder 337 is deactivated, the cutting apparatus passes through a reverse cycle until all of the elements are in a resting position as shown in FIG. 27. As the piston rod 338 approaches the lowermost position, the magnet 406 actuates the switch 407 to condition the indexing circuit of the turntable 48 for operation upon the actuation of another switch by the operator.

Referring to FIGS. 30 through 35, inclusive, as the turntable 48 is indexed to position the holding fixture 49 adjacent to the work station 57, the air cylinder 411 is actuated to pivot the lever 414 and also to pivot the solder feed mechanism 55 which is identical to the solder feed mechanism as disclosed in the solder and tinning operation. In addition, the arm 419 is pivoted to pivot the soldering bar 423. The arm 424 which is mounted to the hub 415 is pivoted to move the rod 426 which pivots the lever 427. As the lever 427 is pivoted, the roller 435 mounted at the free end thereof engages the underside of the component holder arms 97 and 98 to pivot the arms 97 and 98 upwardly. Simultaneously, the arms 436 and 437 are pivoted so that the rollers 438 and 439, respectively, which are mounted at the free ends thereof, engage the pair of cams 469 and 471, respectively, along the vertical edges of the cam as shown in FIG. 28. The quarter-cylindrical portions 476 formed on the hubs 474 and 475 of the cams 469 and 471, respectively, engage the shoulders 499 (FIG. 35) of the semicylindrical portions 468 of the hubs 465 and 466. The abutment of the quarter-cylindrical portion 476 against the shoulder 499 prevents rotation of the cams 469 and 471 in a counterclockwise direction as viewed in FIG. 4. Therefore, the cams are urged laterally in a rearward direction thereby moving the U-shaped member 446, and hence the rods 444 and 445 which are clamped thereto, in a rearward direction against the action of compression springs 458 and 459.

Continued pivotal movement of the lever 427 positions the connector holding nest 90 so that the plurality of U-shaped terminals 42 engage and assemble therein the corresponding plurality of cantilevered, tinned conductors 41. As the rollers 438 and 439 disengage the vertical edges of the cams 469 and 471, respectively, the U-shaped member 446, and hence the support rods 444 and 445 are urged to the left by the biasing action of springs 458 and 459, as viewed in FIGS. 31 and 32, so that the free ends of the rods 444 and 445 are positioned subjacent to the connector 43. Continued pivotal movement of the lever 424 urges the block 425 slidably upon the rod 422 to compress the spring 429. By utilization of the compression spring 429 in this arrangement, the lever 427, and hence the roller 425, provides a more substantial means for holding the connector 43 in place during the assembling operation. Further, the soldering bar 423 is pivoted into engagement with the plurality of cantilevered strips of solder 291 which were advanced by the solder feed mechanism 55 and melts the cantilevered portions of the strips of solder and retains the molten solder thereon in individual portions. Further pivotal movement of the soldering bar 423 deposits the molten solder about the plurality of assembled conductors 41 and the U-shaped terminals 42 whereupon the lever 414 engages the stop 501. After the molten solder has been allowed to flow about the individual assembled conductors 41 and the U-shaped terminals 42, the solenoid 503 is actuated to provide an air supply for the cylinder 504 whereupon a blast of cooling air is provided for the assembled conductors and terminals through the apertures 505 formed in the cylinder 504. As the piston rod 412 reaches the uppermost point of travel, a magnet actuates a switch to operate the solenoid 409 thereby operating the air cylinder 411 in the opposite direction. As the pivotal movement of the lever 414 is reversed, the soldering bar 423 is pivoted away from the soldered joints and the solder feed mechanism 55 is also pivoted away from the soldered joints as previously described. The arm 424 is pivoted in a clockwise direction as viewed in FIG. 31 to slide the block 425 about the rod 426 where, upon engagement by the block 425 with the block 431, the lever 427 is pivoted downwardly. As the lever 427 is pivoted downwardly the connector holder arms 97 and 98 are also pivoted downwardly due to the biasing action of the tension springs 105 and 106. As the connector holding nest 90 is pivoted downwardly by the pivotal movement of the arms 97 and 98, the connector 43 engages the upper surface of the support rods 444 and 445 and is hence prevented from further downward movement whereupon the pivotal clamps 112 and 113 are pivoted against the action of the spring-loaded plungers 114 and 115, respectively, to release the connector 43 from the connector holding nest 90. Simultaneously, the arms 436 and 437 are rotated in a clockwise direction as viewed in FIG. 31 and engage the underside of the cams 469 and 471 and pivot the cams in a clockwise direction as viewed in FIG. 28 so that the quarter-cylindrical portions 476 rotate in a clockwise direction as viewed in FIG. 29. As the cams 469 and 471 are pivoted, the torsion springs 477 are biased so that as the rollers 438 and 439 pivot away from the cams 469 and 471, the cams 469 and 471 return to a resting position by the action of the torsion springs 477. As the piston rod 412 reaches the lowermost point of travel, as viewed in FIG. 30, a magnet operates a switch which conditions the turntable indexing circuit for operation upon the actuation of another switch by the operator. As the operator actuates the second switch, the turntable 48 is indexed to the loading station 50 wherein the operator removes the completed product 59.

It is to be noted that the conductors 41 are solidified by the application of the strips of solder 291, in a molten state, onto the areas of the conductors at the second work station 54. In this manner the conductor ends are solidified so that they may be positioned in the U-shaped terminals 42 of the connector 43 thereby preventing the strands of the conductors 41 from fanning out and contacting adjacent terminals 42. Further, as the soldering bar 423 deposits solder onto the assembled conductors 41 and the terminals 42, the solder which was previously deposited on the conductors for solidifying the ends thereof is again placed in a molten state thereby allowing the strands to disassemble within the U-shaped terminal 42 and provide a more substantial conductor-to-terminal connection. In the alternative, a conductive cement or thermo-setting paste could be utilized at the tinning station to provide substantially solidified conductor ends in the same manner as described hereinbefore.

What is claimed is:

1. The method of preparing a solidified end on an insulated, stranded conductor, comprising the steps of:
separating a portion of the insulation on the stranded conductor end from the remaining insulation,
partially withdrawing the separated portion of the insulation from the remaining insulation so that an area of the stranded conductor is exposed thereby and the conductor strands are retained in a substantially grouped arrangement,
depositing molten solder about the exposed strands of the conductor so that the exposed area is substantially solidified upon cooling of the solder, and
severing the stranded conductor in the solidified area, thereby providing a solidified conductor end.

2. The method of assembling and securing the free ends of a plurality of insulated, stranded conductors to a plurality of terminals of an electrical element, comprising the steps of positioning the insulated conductors in a fanned cantilevered fashion so that the free conductor ends are commonly aligned, exposing an axial portion of each of the stranded insulated conductors a predetermined distance from the respective free ends thereof, solidifying the exposed area of the conductors, to coalesce the strands, severing the conductors at the solidified areas to provide solidified conductor ends, and securing the solidified ends of the conductors to the terminals.

3. The method of assembling and securing a plurality of insulated, stranded conductors to a plurality of terminals of an electrical element, which comprises the steps of positioning the conductors in a fanned cantilevered arrangement, burning a portion of the insulation from the conductors in a traversing manner, partially removing the remaining insulation between the burned area and the end of the conductors, depositing solder on each of the conductors in the areas exposed by the partial removal of the insulation, cutting the conductors in the soldered areas to provide solidified conductor ends, positioning the solidified conductor ends into the terminals of the element, and soldering the conductors to the terminals.

4. An apparatus for assembling and securing a plurality of insulated stranded conductors to a plurality of terminals of a connector, comprising a movable carrier, holding means on the carrier for receiving the connector and the plurality of conductors so that the conductor ends extend in a cantilevered fashion away from the carrier; a first work station adjacent to the carrier, and means in the first work station for separating a portion of the insulation on the conductor ends from the remaining insulation in a plane traversing the conductor; a second work station adjacent to the carrier, means in the second work station for partially withdrawing the separated insulation on the cantilevered ends of the conductors so that a portion of each of the stranded conductors is exposed, and means for depositing a binding material on the exposed portions of each of the stranded conductors so that the portions are substantially solidified; a third work station adjacent to the carrier, and means in the third work station for severing the conductors at the solidified areas to provide solidified conductor ends; a fourth work station adjacent to the carrier, means in the fourth work station for positioning the connector adjacent to the solidified ends of the stranded conductors so that the ends are assembled in the terminals of the connector, and means for soldering the conductors to the terminals; and means for moving the carrier between the work stations.

5. An apparatus for assembling and securing a plurality of insulated stranded conductors to a plurality of terminals of a connector, comprising a movable carrier, holding means on the carrier for receiving the connector and the plurality of conductors so that the conductor ends extend in a cantilevered fashion away from the carrier; a first work station adjacent to the carrier, a pair of opposed burning devices for receiving the conductor ends therebetween at the first work station, means for urging said burning devices about a portion of the insulation at the cantilevered conductor ends, and means for rendering the burning devices operable so that the insulation engaged therebetween is burned from the conductors; a second work station adjacent to the carrier, means in the second work station for partially withdrawing the insulation remaining between the removed area and the cantilevered ends of the conductors so that a portion of each of the stranded conductors is exposed and means for depositing a binding material on the exposed portions of each of the stranded conductors so that the area is substantially solidified; a third work station adjacent to the carrier, and means in the third work station for severing the conductors at the solidified area to provide solidified conductor ends; a fourth work station adjacent to the carrier, means in the fourth work station for positioning the connector adjacent to the solidified ends of the stranded conductors so that the ends are assembled in the terminals of the connector, and means for soldering the conductors to the terminals; and means for moving the carrier between the work stations.

6. An apparatus for conditioning a plurality of insulated stranded conductors to provide solidified conductor ends wherein a plurality of conductors are initially held in a fanned, cantilevered fashion, comprising means for separating a portion of the insulation on the conductor ends from the remaining insulation in a plane traversing the conductors, a pair of pivotally opposed clamping members for receiving the conductors therebetween, resilient means for urging the clamping members about the separated portions of insulation remaining on the conductor ends, means for resiliently moving the clamping members in a path parallel to the conductor axes so that the separated insulation contained therebetween is partially withdrawn thereby exposing an area of the stranded conductors, means for depositing a binding material onto the strands of the conductors thereby providing a substantially solidified area, and means for severing the conductors in the solidified areas to provide solidified conductor ends.

7. An apparatus for providing a solidified end on an insulated stranded conductor, comprising means for separating a portion of the insulation on the conductor end from the remaining insulation, means for partially withdrawing the insulation remaining between the removed portion and the conductor end so that an area of the stranded conductor is exposed thereby and the conductor strands are retained in a substantially grouped arrangement, means for depositing a binding material about the strands of the conductor in the exposed area so that the exposed area is substantially solidified, and means for severing the conductor in the solidified area thereby providing a solidified conductor end.

8. An apparatus for solidifying a portion of a plurality of insulated stranded conductors which comprises means for separating a portion of the insulation on the conductor ends from the remaining insulation so that a portion of the strands are bared thereby, a pair of opposed clamping members for receiving the conductor ends therebetween, an insulation stripping comb mounted on one of the clamping members for receiving the bared strands of the conductors between the teeth thereof, means for resiliently clamping said members around the separated insulation remaining on the conductor ends and for inserting the bared strands of the conductors between the teeth of the comb, means for moving the clamping members and the comb in a path parallel to the axes of the conductors so that the separated insulation remaining on the conductor ends is partially withdrawn therefrom thereby exposing a substantial area of the stranded conductors, camming means for disengaging the comb from the clamping member and the exposed conductor areas, and means for depositing a binding material onto the exposed areas of the stranded conductors so that the exposed areas are substantially solidified.

9. An apparatus for assembling and securing a plurality of insulated stranded conductors to a plurality of terminals of a connector, comprising a movable carrier, holding means on the carrier for receiving the connector and the plurality of conductors so that the conductor ends extend in a cantilevered fashion away from the table; a first work station adjacent to the carrier, and means in the first work station for separating a portion of the insulation on the conductor ends from the remaining insulation in a plane traversing the conductors; a second work station adjacent to the carrier, a pair of opposed clamping members for receiving the conductor ends therebetween at the second work station, a movable soldering bar, means for advancing strips of solder from a supply to a position adjacent to the soldering bar, means for positioning the clamping members about the separated insulation remaining on the cantilevered conductor ends, means for retracting the clamping members along a path parallel to the conductor axes so that the separated insulation contained therebetween is partially withdrawn to expose an area of the stranded conductors, means for moving the soldering bar into engagement with the strips of solder so that portions of the solder are melted and deposited on the exposed areas of the stranded conductors, and means for cooling the deposited solder so that the exposed areas are substantially solidified; a third work station adjacent to the carrier, and means in the third work station for severing the conductors at the solidified area to provide solidified conductor ends; a fourth work station adjacent to the carrier, means in the fourth work station for positioning the connector adjacent to the solidified ends of the stranded conductors so that the ends are assembled in the terminals of the connector, and means for soldering the conductors to the terminals; and means for moving the carrier between the work stations.

10. An apparatus for assembling and securing a plurality of insulated stranded conductors to a plurality of terminals of a connector, comprising a movable carrier, holding means on the carrier for receiving the connector and the plurality of conductors so that the conductor ends extend in a cantilevered fashion away from the carrier; a first work station adjacent to the carrier, and means in the first work station for separating a portion of the insulation on the conductor ends from the remaining insulation in a plane traversing the conductors; a second work station adjacent to the carrier, means in the second work station for partially withdrawing the separated insulation remaining on the cantilevered ends of the conductors so that a portion of each of the stranded conductors is exposed, and means for depositing a binding material on the exposed portions of each of the stranded conductors so that the area is substantially solidified; a third work station adjacent to the carrier, a fixed blade positioned at the third work station, a movable blade positioned in an opposing fashion to the fixed blade for receiving the cantilevered conductor ends therebetween, and means for moving the movable blade to sever the conductors at the solidified area thereby providing solidified conductor ends; a fourth work station adjacent to the carrier, means in the fourth work station for positioning the connector adjacent to the solidified ends of the stranded conductors so that the ends are assembled in the terminals of the connector, and means for soldering the conductors to the terminals; and means for moving the carrier between the work stations.

11. An apparatus for assembling and securing a plurality of insulated stranded conductors to a plurality of terminals of a connector, comprising a movable carrier, holding means on the carrier for receiving the connector and the plurality of conductors so that the conductor ends extend in a cantilevered fashion away from the carrier; a first work station adjacent to the carrier, and means in the first work station for separating a portion of the insulation on the conductor ends from the remaining insulation in a plane traversing the conductors; a second work station adjacent to the carrier, means in the second work station for partially withdrawing the separated insulation remaining on the cantilevered ends of the conductors so that a portion of each of the stranded conductors is exposed, and means for depositing a binding material on the exposed portions of each of the stranded conductors so that the area is substantially solidified; a third work station adjacent to the carrier, and means in the third work station for severing the conductors at the solidified area to provide solidified conductor ends; a fourth work station adjacent to the carrier, means in the fourth work station for positioning the connector so that the solidified ends of the conductors are assembled in the terminals of the connector, a movable soldering bar, means for moving the soldering bar into engagement with strips of solder so that portions of the strips of solder are melted and deposited on the assembled conductors and terminals, means for cooling the deposited solder so that the conductors are secured to the terminals, and means for releasing the connector from the connector holding means; and means for moving the carrier between the work stations.

12. An apparatus for assembling and securing a plurality of insulated stranded conductors to a plurality of terminals of a connector, comprising a rotatable table, means mounted on the periphery of the table for receiving and holding the plurality of insulated stranded conductors in a fanned arrangement so that the conductor ends extend in a cantilevered fashion away from the table, a comb having arms slidably mounted in the conductor holding means for receiving the cantilevered ends of the conductors between a plurality of teeth of the comb, and pivotal means mounted on the periphery of the table for receiving and holding the connector; a first work station adjacent to the periphery of the table, a pair of opposed burning devices for receiving the conductor ends therebetween at the first work station, means for urging said burning devices about a portion of the insulation at the cantilevered conductor ends, and means for rendering the burning devices operative so that the insulation engaged therebetween is burned from the conductors; a second work station adjacent to the periphery of the table, a pair of opposed clamping members for receiving the conductor ends therebetween at the second work station, a movable soldering bar, means for positioning the clamping members about the insulation remaining on the cantilevered conductor ends, means for retracting the clamping members along a path parallel to the conductor axis so that the insulation contained therebetween is partially withdrawn to expose an area of the stranded conductors and the strands are retained in a substantially grouped arrangement, means for moving the soldering bar into engagement with strips of solder so that portions of the solder are melted and deposited on the exposed areas of the stranded conductors, and means for cooling the deposited solder so that the exposed areas are substantially solidified; a third work station adjacent to the periphery of the table, a fixed blade positioned at the third work station, a movable blade positioned in an opposing fashion to the fixed blade for receiving the cantilevered conductor ends therebetween, means for moving the movable blade to sever the conductors at the solidified areas so that the conductors are provided with solidified ends whereby the remaining portions of the severed conductors are retained between the teeth of the comb, and a comb pusher pivotally mounted in the third work station, and means for urging the comb pusher against the remaining portions of the conductors so that the conductors are partially removed from between the comb teeth and for pushing the comb away from the conductor holding means, means in the fourth work station for positioning the connector so that the solidified ends of the conductors are assembled in the terminals of the connector, a movable soldering bar, means for advancing strips of solder adjacent to the soldering bar, means for moving the soldering bar so that portions of the strips of solder are melted and deposited on the assembled conductors and terminals, and means for cooling the deposited solder so that the conductors are secured to the terminals; and means for moving the table between the work stations.

References Cited by the Examiner

UNITED STATES PATENTS

| | | | |
|---|---|---|---|
| 2,592,276 | 4/1952 | Hackbarth | 153—1 |
| 2,606,228 | 8/1952 | Chouljian | 339—192 |
| 2,858,515 | 10/1958 | Thunander et al. | 339—176 |
| 2,861,324 | 11/1958 | Klumpp | 29—155.55 |
| 2,873,511 | 2/1959 | Folkenroth | 29—155.55 |
| 2,884,887 | 5/1959 | Gray et al. | 113—128 |
| 2,932,810 | 4/1960 | Novak | 339—176 |
| 3,014,447 | 12/1961 | Walker et al. | 113—128 |

OTHER REFERENCES

Electronic Design, December 7, 1960 (pages 32 and 33 relied upon).

WHITMORE A. WILTZ, *Primary Examiner.*

JOHN F. CAMPBELL, *Examiner.*